United States Patent [19]

Gephart et al.

[11] Patent Number: 4,709,318
[45] Date of Patent: Nov. 24, 1987

[54] UPS APPARATUS WITH CONTROL PROTOCOLS

[75] Inventors: Don A. Gephart, Delaware; Jeffrey M. Powell, Galena, both of Ohio

[73] Assignee: Liebert Corporation, Columbus, Ohio

[21] Appl. No.: 922,022

[22] Filed: Oct. 22, 1986

[51] Int. Cl.⁴ .................................. H02M 5/45
[52] U.S. Cl. ........................... 363/37; 307/66
[58] Field of Search ............. 363/37, 49; 307/46, 307/64–66, 82

[56] References Cited

U.S. PATENT DOCUMENTS

| | | | |
|---|---|---|---|
| 3,573,483 | 4/1971 | White | 307/66 |
| 4,313,060 | 1/1982 | Fickenscher et al. | 363/37 X |
| 4,379,325 | 4/1983 | Krampe et al. | 363/37 X |
| 4,384,214 | 5/1983 | Crick et al. | 307/66 |
| 4,506,766 | 3/1985 | Watanabe | 363/37 X |
| 4,642,475 | 2/1987 | Fischer et al. | 363/37 X |

FOREIGN PATENT DOCUMENTS

| | | | |
|---|---|---|---|
| 2111326 | 6/1983 | United Kingdom | 307/66 |
| 2137833 | 10/1984 | United Kingdom | 307/66 |

*Primary Examiner*—Patrick R. Salce
*Assistant Examiner*—Marc S. Hoff
*Attorney, Agent, or Firm*—Mueller and Smith

[57] ABSTRACT

Power treatment apparatus of a UPS variety which includes a central node to which is coupled an a.c.-to-d.c. converter or conversion device, the a.c. side of which is connectable with line power and the d.c. side of which is coupled with the node. The node additionally is coupled to an output d.c.-to-a.c. converter or conversion device, the a.c. side of which is connectable with a load. Additionally, the node is coupled to a d.c.-to-d.c. converter which operates bidirectionally in conjunction with a rechargeable battery supply. The latter conversion device includes an inverter, the d.c. side of which is coupled to the battery and the a.c. side of which is coupled through a voltage boosting arrangement with a synchronous rectifier. A control protocol is developed for start-up procedures wherein the d.c./d.c. inverter is enabled only following a preliminary start-up evaluation procedure including power supply monitoring. Following this start-up, the output conversion device is enabled such that initial operation commences with battery power. Finally, the input converter is enabled to bring the node to its full operational voltage level.

26 Claims, 10 Drawing Figures

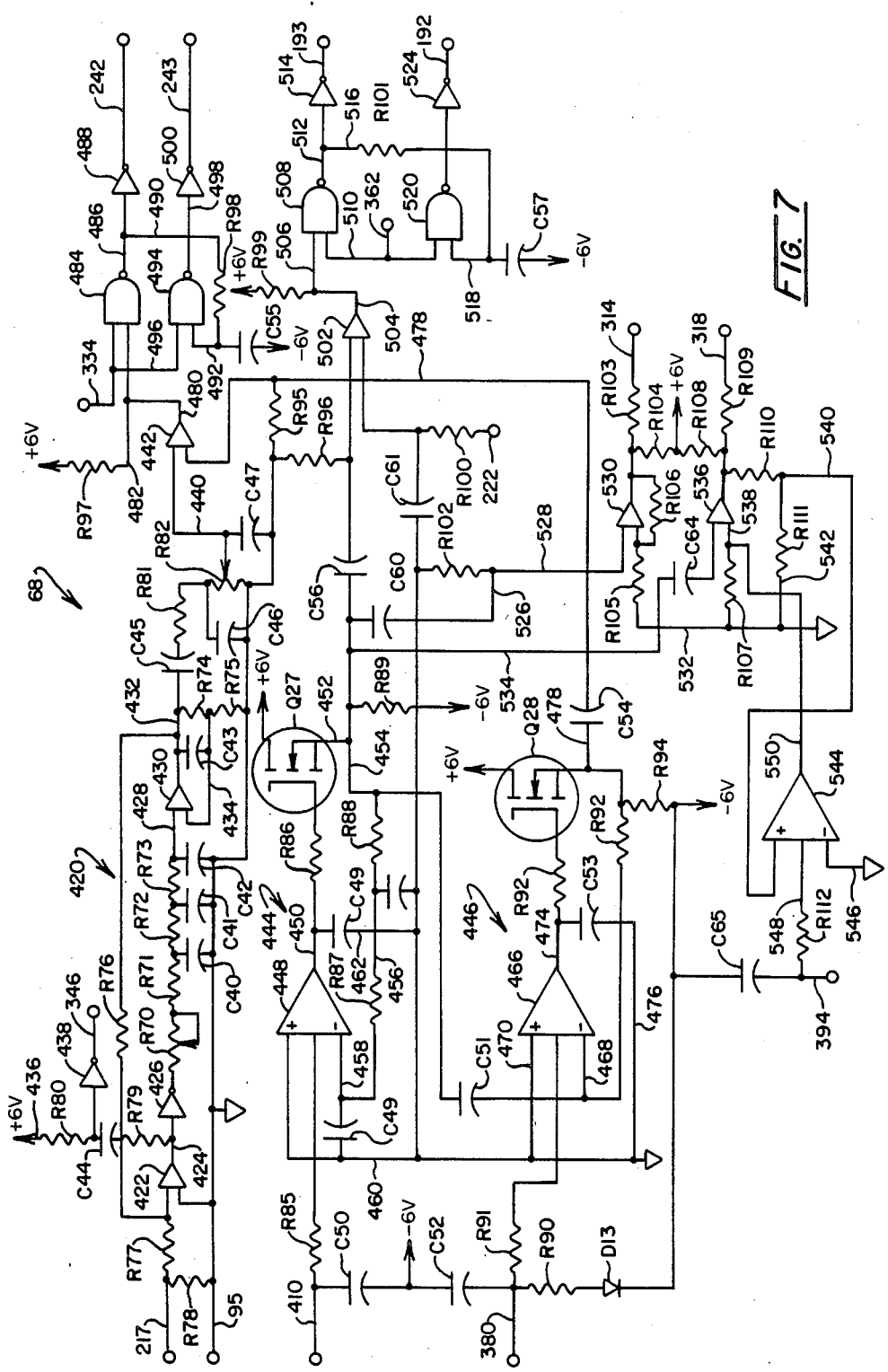

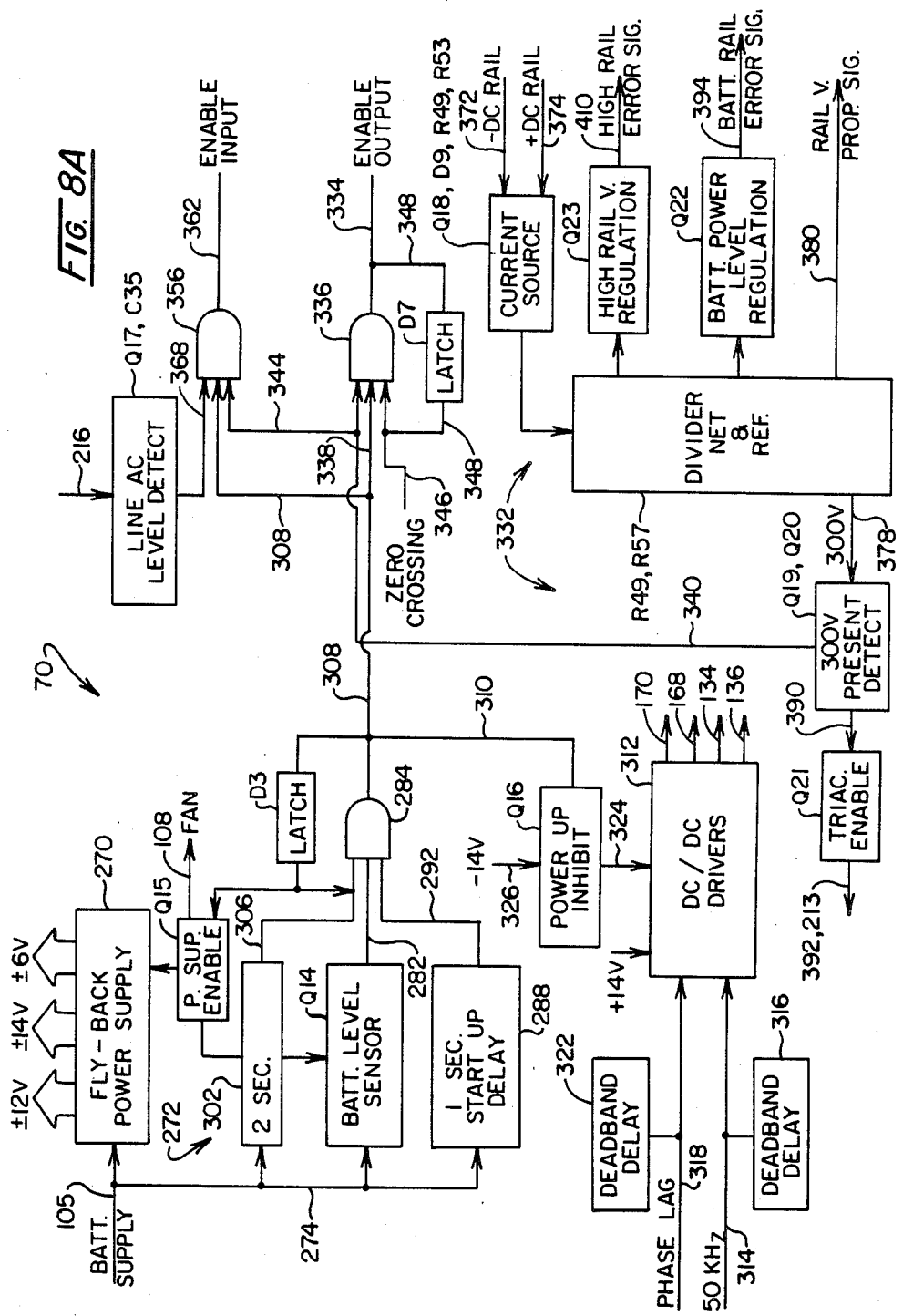

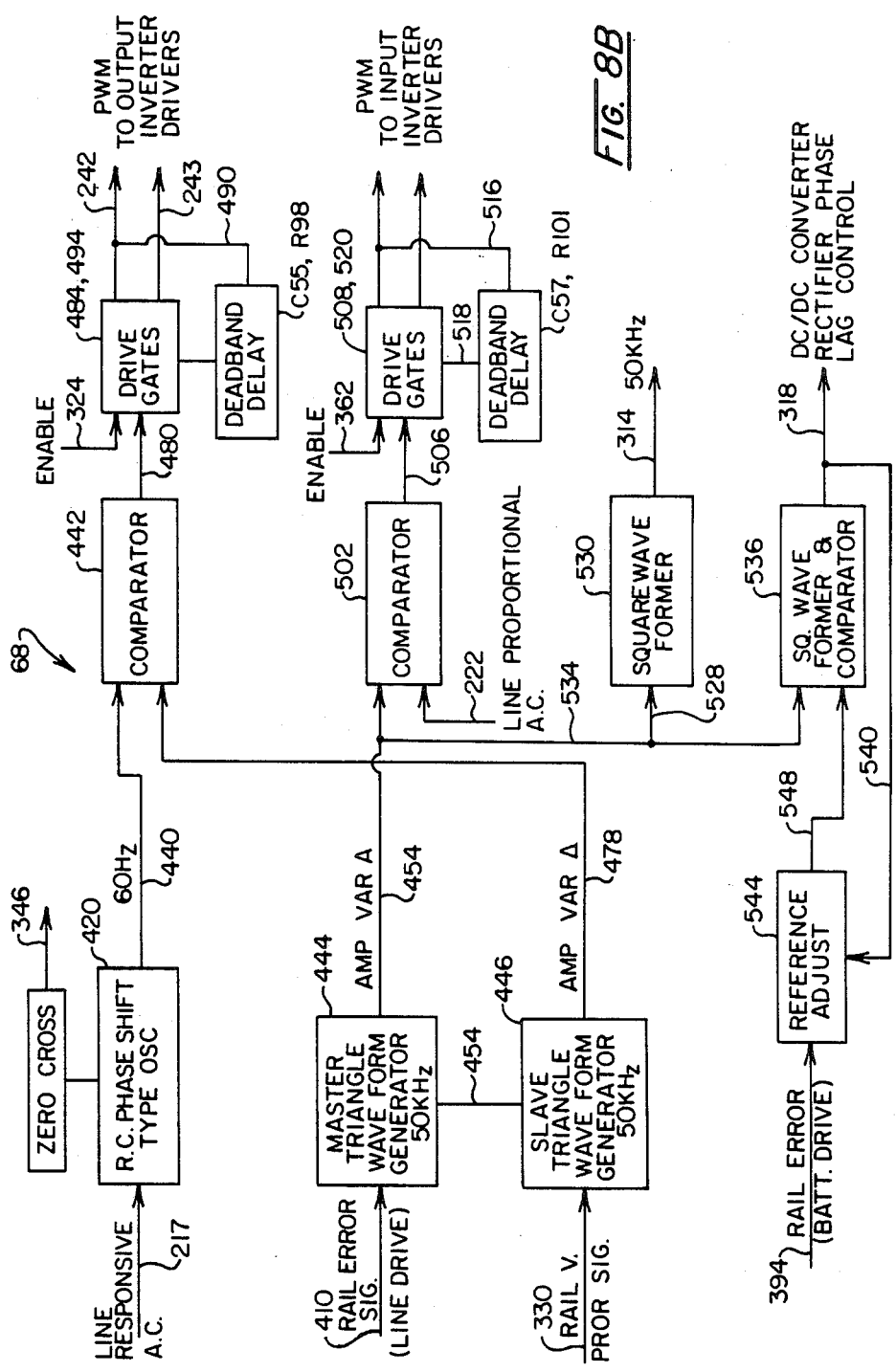

UPS APPARATUS WITH CONTROL PROTOCOLS

BACKGROUND OF THE INVENTION

The continuing expansion and world-wide growth of technically sophisticated industries such as those concerned with computers and computer based products including telecommunications equipment have led to concomitant expansion and growth in support industries, particularly those concerned with power supplies. Larger, sophisticated computer installations have been seen to require assured high quality input power supplies not generally available directly from the line outputs of utilities. Accordingly, a wide range of somewhat elaborate power improvement approaches are employed by industry.

Early efforts to overcome the aberrations of line power supplies have evolved a variety of power conditioning devices, for example, uninterruptible power supplies (UPS) using a battery charger, batteries, an inverter, and static switch arrangement which may be installed to evoke waveform re-creation. Further, motor generators have been provided to achieve power assurance. In some approaches, systems have been provided which modify, but do not recreate waveforms, for example, such as voltage regulators or spike suppressors. The latter systems basically are ineffective in the treatment of a variety of adverse conditions which may be encountered. Over the recent past, a polyphase ferroresonant voltage stabilizer or synthesizer has been successfully employed in the marketplace. In their elementary form, such synthesizers comprise a regulator which is fashioned as a non-linear saturable transformer arrangement in parallel with a capacitor assembly which is supplied from the line source through an input inductor. The saturable transformer components and capacitors form a ferroresonant circuit wherein the reactive components operate beyond the knee of a conventional magnetization curve. Such device, for example, are described in U.S. Pat. Nos. 4,305,033 and 4,544,877 by Jeffrey M. Powell.

More recently, utility interactive systems have been proposed which function to independently generate a sinewave output and which are connected to a utility through some form of inductor. Employing batteries as an independent source, these devices operate with four quadrant inverters and the like in conjunction with a battery second source to skew the phase relationship of the inverter function with the utility line input to develop a selective reactive power flow. These utility interactive systems exhibit excellent power factor characteristics and impose very low distortion on the utility with which they interact.

As the capability and capacities of the conveniently priced and sized personal computers and word processing systems have improved, their utility has expanded to an extensive diversity of applications. Correspondingly, these devices and their applications have become more and more critical to the operations of industry. Thus, business and industry have sought a highly reliable utility power line input treatment technique which is available at a price commensurate with the personal computer and the word processor and which exhibits performance characteristics of high reliability and efficient operation. To complement the relatively small size of these personal computers, such power treatment devices must be fabricable in compact size and convenient in shape. Further, the devices should incorporate a UPS feature providing for self-contained battery operation in the event of line power failure. While this uninterruptible power feature is needed, its performance duration may be limited concomitantly with those power outage problems typically encountered by the personal computer or word processor user.

SUMMARY

The present invention is addressed to a UPS apparatus which is ideally suited for employment with critical loads such as personal computers or similarly technically sophisticated instrumention, but which remains fabricable in quite compact form. Of particle importance to the range of uses with which the invention may be employed, the instant apparatus exhibits a high reliability achieved, inter alia, in consequence of the control asserted over its principal components. These components include an input a.c.-to-d.c. converter, the d.c. side of which is connected to a control node and the a.c. side of which is coupled to a utility line input. The node is coupled to the d.c. side of an output d.c.-to-a.c. converter, the a.c. side of which is connectable with a critical load. To maintain node voltage levels during line power loss, the node is coupled to a rechargeable battery power supply through a d.c.-to-d.c. converter. The controls of the apparatus achieve a form of protocol at start-up which initially monitors a variety of operational parameters to assure that appropriate start-up conditions are present. When these start-up condition show an adequacy for operation, the d.c./d.c. conversion components initially are enabled and the resultant voltage build-up at the central node of the system is monitored. At such time as these node voltage conditions are sufficient, then the output conversion components are enabled to commence powering the critical load from battery energy. As adequate node conditions further are developed, the input conversion function is enabled to commence to supply line power to the energization of the central node. With the protocol, important degrees of reliability are achieved.

The apparatus also includes an automatic shut-down feature which is quite useful in operations where, after operation under battery power for a given time and load causing the battery to fall to a predetermined level, the system will shut-down. This level is selected such that the batteries are protected and is determined with respect to the battery being operated under load conditions. After such shut-down, the system will not return to operation unless the master actuating switch is turned off and then turned on again by the operator. At such time as adequate a.c. line power is available, such switch actuation will effect a recharging of the batteries while the apparatus operates under a.c. line power. In the event such actuation is carried out by the operator without the presence of adequate line power, then the apparatus will shut-down again to preserve battery power.

As another feature of the invention, power supply apparatus is provided which is employable with an a.c. source of given voltage and frequency for providing a regulated output to a load. A node is provided for receiving and conveying energy and which exhibits d.c. voltage levels. An input a.c.-to-d.c. converter is provided having its a.c. side connectable with the a.c. source and its d.c. side connected with the node for effecting energy transmission from the a.c. source when enabled. An output d.c.-to-a.c. converter is provided having an a.c. side connectable with the load and a d.c.

side connected with the node for controllably deriving the regulated output when it is enabled. A rechargeable storage reservoir in the form of battery components provides given voltage levels and a d.c.-to-d.c. converter is coupled intermediate the node and the battery for controllably transferring energy from the battery to the node when enabled and for selectively effecting the charging of the battery from the node. On and off conditions for the apparatus are provided from a switch and control is included which incorporates a start-up control arrangement which is responsive to the switch actuation from its off to its on condition and to the presence of a first predetermined voltage level at the battery for deriving a start-up enabling signal, as well as for effecting the enablement of the d.c.-to-d.c. converter to derive node voltage levels. Additionally, a node monitoring circuit is included to respond to the node d.c. voltage levels for deriving the first node voltage responsive signal when the node levels reach a predetermined start-up value. An output control responds to the first node voltage responsive signal and the start-up enabling signal for effecting enablement of the output d.c.-to-a.c. converter.

Another feature of the invention is to provide power supply apparatus for use with an a.c. source of given voltage and frequency for providing an output to a load which includes a node for receiving and conveying energy and exhibiting d.c. voltage levels. The a.c. control, for example in the form of a triac, is connectable with the a.c. source for conveying corresponding a.c. energy to an output when the control is enabled. To the latter output, then is connected an output d.c.-to-a.c. converter having an a.c. side coupled with the control output and having a d.c. side coupled with the node for effecting energy transfer from the a.c. source, when enabled, and in conjunction to a control input. A battery arrangement within the apparatus provides a rechargeable storage reservoir and exhibits given voltage levels, while an oscillator provides an a.c. output of predetermined frequency and phase and has an input responsive to an applied a.c. signal of given phase derived from the a.c. control output for effecting phase coincidence between the given phase of the source and the output phase. Further, a signal generator is provided for generating a triangle waveshape output of controlled amplitude and an output d.c.-to-a.c. converter is included having an a.c. side connectable with the load and a d.c. side coupled with the node and which is controllably responsive to the oscillator output and the signal generator output for deriving the regulated output when enabled. A d.c.-to-d.c. converter is coupled intermediate the node and the battery for transferring energy from the battery to the node when enabled and for selectively effecting the charging of the battery from energy at the node. A control is incorporated which includes a start-up control arrangement responsive to the presence of a first predetermined voltage level at the battery for deriving a first enabling signal effecting the enablement of the d.c.-to-d.c. converter to initially develop node voltage levels from the battery. The start-up control further incorporates a node monitoring circuit responsive to the node voltage levels for deriving a first node voltage responsive signal when the node levels reach a predetermined first value and an output control responds to the enabling signal and the node voltage responsive signal for effecting the enablement of the output d.c.-to-a.c. inverter.

Other objects and features of the invention will, in part, be obvious and will, in part, appear hereinafter.

The invention, accordingly, comprises the apparatus possessing the construction, combination of elements, and arrangement of parts which are exemplified in the following detailed disclosure. For a fuller understanding of the nature and objects of the invention, reference should be had to the following detailed description taken in connection with the accompanying drawings.

BRIEF DESCRIPTION OF THE DRAWINGS

FIG. 7 is a schematic circuit diagram of the signal components of the apparatus of the invention representated in block form in FIG. 3; and FIGS. 8A and 8B are block schematic diagrams showing in diagrammatic form the interrelationship of the components of the circuits of respective FIGS. 6 and 7.

DETAILED DESCRIPTION

In its basic architecture, the power supply enhancement approach of the instant invention employs a circuit wherein a central energy reservoir which is present as rechargeable battery is operationally coupled with what may be termed a "node" or pumping location. This node, in turn, is connected to an energy conversion device to provide an output for deriving a critical load using the energy which is made available at the node. Of particular importance, the node also is connected to an a.c. utility line input which functions as the principal source of power and this connection is provided through a bi-directional energy conversion device. The bidirectional conversion device reflects the waveshape of the incoming a.c. energy and by amplitude adjustment, selectively supplies energy to the node and, where required, to replenish the battery energy reservoir. Where the a.c. input source is inadequate, the node is brought to its operational energy level or a predetermined level deemed adequate to maintain operation, by drawing upon the energy of the battery reservoir. Because the a.c. input or utility line input confronts a conversion device output which essentially mimics it, it addresses what, in effect, is a psuedo-resistance and thus, the interface with a power utility is one exhibiting good power factor characteristics.

Figure 1:
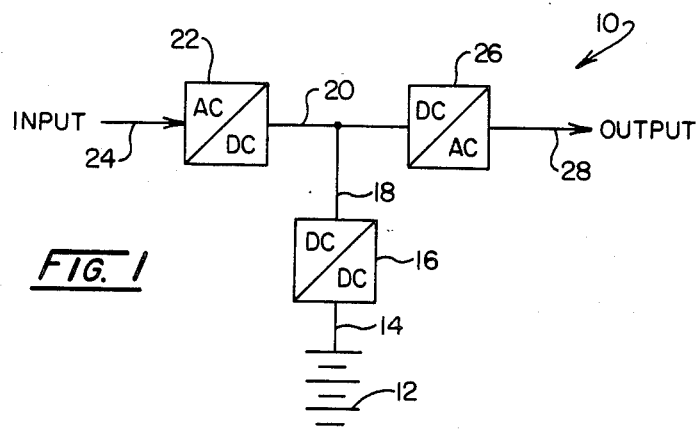
FIG. 1 is a diagrammatic view of the power treatment apparatus of the invention.

While a variety of figurations of node driven devices and systems are realizable as described in co-pending application for U.S. Pat. Ser. No. 906,176 entitled "Uninterruptable Power Supply with Energy Conversion and Enhancement"by Powell and Gephart, filed Sept. 11, 1986, and assigned in common herewith, a configuration particularly suited for use with relatively compact devices is revealed in conjunction with FIG. 1. This system performs ideally in conjunction with personal computers and similar computer driven devices as well as laboratory instrumentation and the like requiring assured quality power but not demanding long-term battery backup. FIG. 1 shows a d.c. node circuit presented generally at 10 which employs two compact rechargeable batteries 12 as an energy reservoir which is coupled as represented by line 14 to one side of a bi-directional d.c.-to-d.c. converter represented at block 16. The d.c. output of converter 16 is directed as represented by line 18 to a d.c. node which, in turn, is represented by line 20. For applications of the type described, the voltage level at node 20 typically will be selected as 200 volts to achieve a nominal 120 v rms output. Node 20 is coupled to the d.c. side of a a.c.-to-d.c. converter represented at block 22, the a.c. side of which is coupled with a.c. source line power as represented at line 24. The a.c. side of converter 22 mimics or reflects the waveshape of the source input represented at line 24 and energy transfer to node 20 is effected by select adjustment of the amplitude of the reflected waveshape. Node 20 also is directed to the d.c. side of a d.c.-to-a.c. converter represented at block 26, the a.c. side of which provides a lower frequency a.c. output (60 Hz) as represented at output line 28. Inductive components are provided in relatively small size with the circuit 10 through the utilization of a PWM inverter and modified synchronous rectifier arrangement at d.c.-to-d.c. conversion function 16. The latter device will be seen to provide energy transfer control by a select phase lag approach to effect conveyance of battery power to the node 20.

Figure 2:
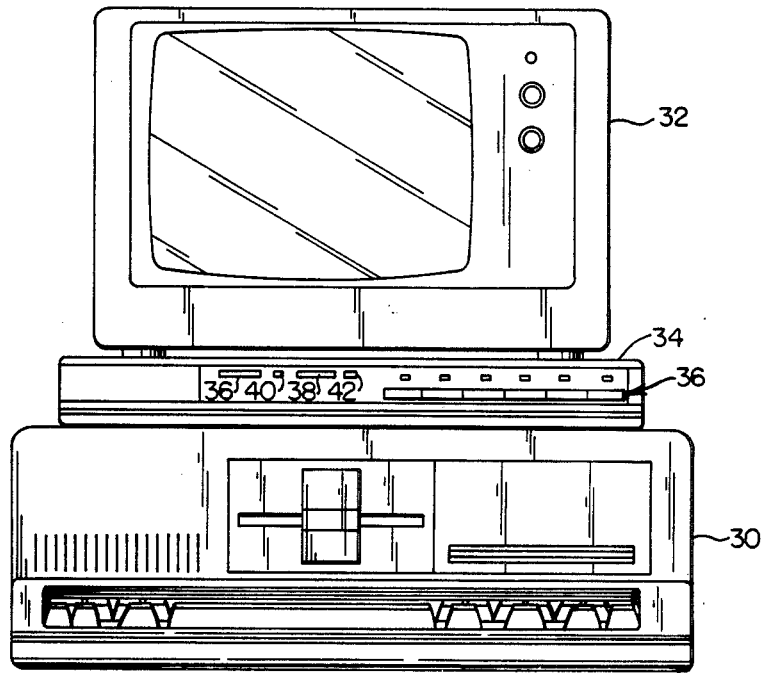
FIG. 2 is a pictorial representation of the employment of the embodiment of FIG. 1 of the invention with a personal computer.

Looking to FIG. 2, a typical employment of the apparatus of the invention in conjunction with a personal computer is revealed. In the figure, a personal computer console is shown at 30 in conjunction with a monitor 32. Between these two components 30 and 32, there is positioned the power treatment apparatus of the invention at 34. The apparatus 34 is quite compact, having a height of slightly more than one and one-half inches and a width across its forwardly facing bezle of about 15 inches. The line a.c. input connection is provided to the device 34 from a typical plug connection which is coupled at the rearward side along with plug outlets both controlled and conditioned as well as outlets essentially passing through a.c. line power. The forward face of apparatus 34 includes a sequence of six switches functioning to turn the device on as well as to activate treated power plug outputs at the rear of the device specifically labelled for user convenience as "computer", "monitor", and "printer". Two additional controlled or regulated plugs are provided and are actuated by corresponding switches at the panel, all such switches as well as indicator lamps showing their actuation are represented in general at 36. The apparatus 34 further includes a readout including an LED type bar graph showing the power consumption at 36 and a similar output showing battery level utilization at 38. Small extensions of the bar graphs 36 and 38 as at 40 and 42 respectively show a condition of overload and a condition wherein a.c. line power is being relied upon and battery charging is taking place if needed. While remaining small, the apparatus 34 incorporates sufficient reservoir sources and power treatment components necessary to achieve a UPS battery reservoir operation for a limited interval sufficient for the use at hand, typically 20 minutes and for carrying out all waveform treatment functions necessitated for protecting such computer devices and the like.

Figure 3:
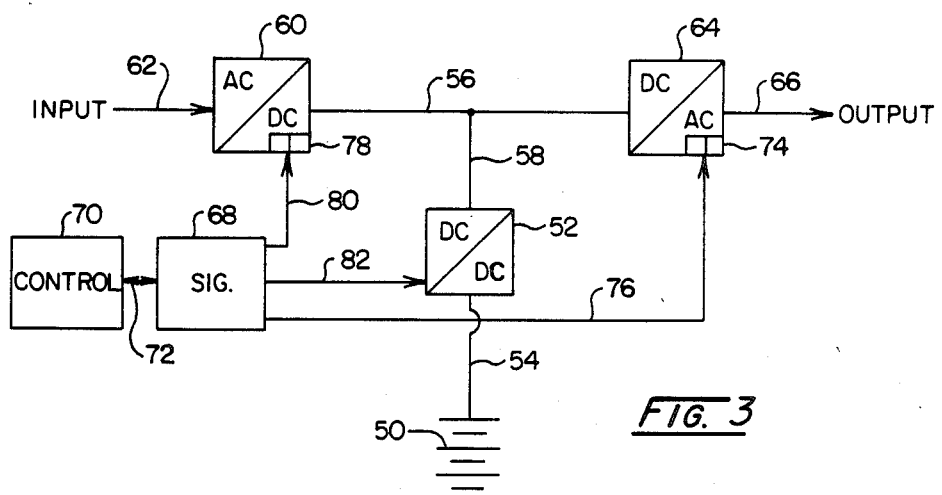
FIG. 3 is a block diagrammatic view of the embodiment of FIG. 1 of the invention showing an enhanced level of detail.

Looking to FIG. 3, a generalized block diagram of the circuit employed within the unit 34 is set forth. The figure shows a battery reservoir 50 which performs in conjunction with d.c.-to-d.c. bi-directional converter 52 as represented by line 54. Converter 52 derives a boosted voltage output which is directed to a pair of rails representing a node and identified at line 56, the association with converter 52 and the node being represented at line 58. The node represented by line 56 is coupled to the d.c. side of an a.c.-to-d.c. converter represented at block 60, the a.c. side of which is coupled to utility line power as represented at line 62. The output of the system is addressed by a d.c.-to-a.c. converter represented at block 64 to provide an improved and secure output as represented at line 66. Control features for the apparatus to be described later herein will be seen to be generated from two circuit groupings, a signal circuit grouping represented at block 68 and a control component grouping represented at block 70. This control grouping of component 70 includes power supplies, enabling logic, logic derived for monitoring of the node 56 and the drivers which are employed with the d.c.-to-d.c. components 52. Enabling logic developed by the control components is employed by the signal grouping of components as represented at line 72. Concerning the assemblage of components represented by block 68, PWM signals directed to the output converter drivers represented at sub-blocks 74 within block 64 are developed and directed to those drivers as represented at line 76. In similar fashion, the PWM controlling output to the converter drivers represented at sub-blocks 78 within block 60 is represented by line 80. A synchronous rectifier phase lag control is presented to the converter 52 from the signal components as represented by line 82.

Figure 4A:
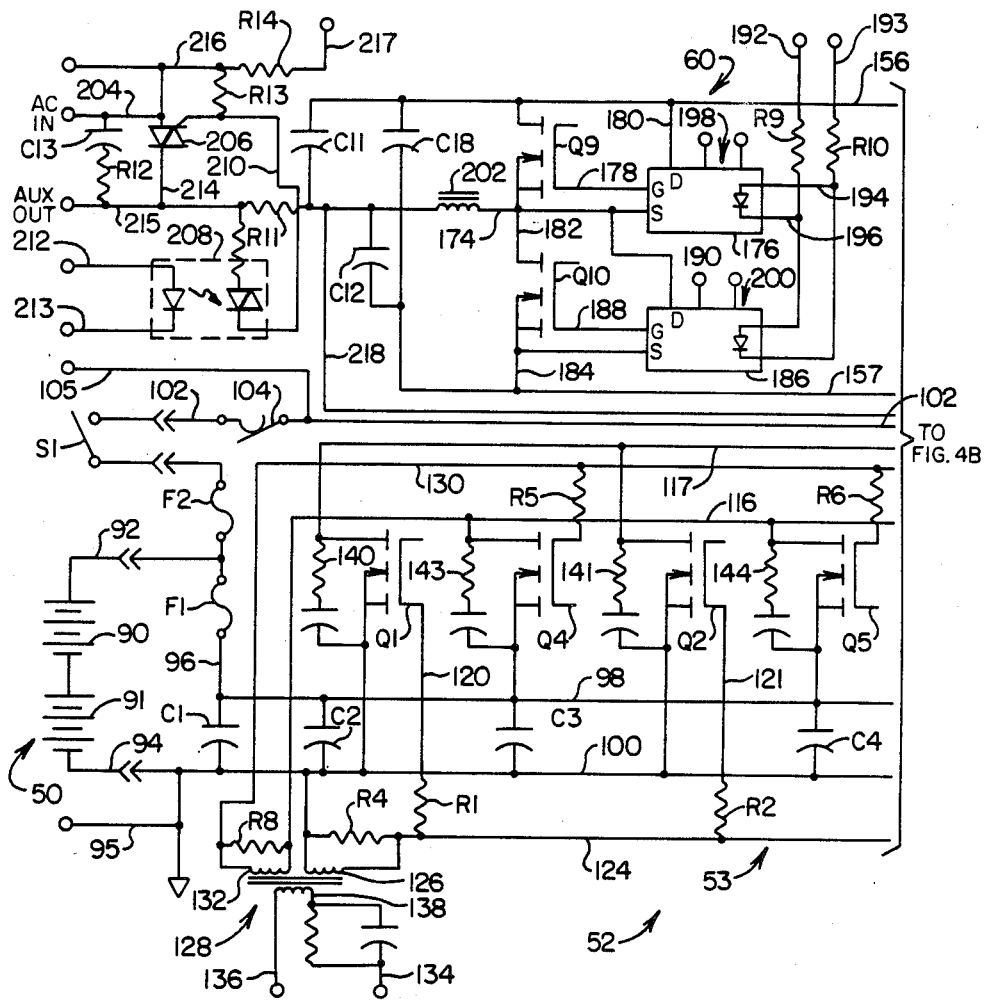
FIGS. 4A and 4B combine to provide a schematic circuit diagram of the input and output inverter functions, as well as the d.c.-to-d.c. function of the embodiment of FIGS. 1 and 3.
Figure 4B:
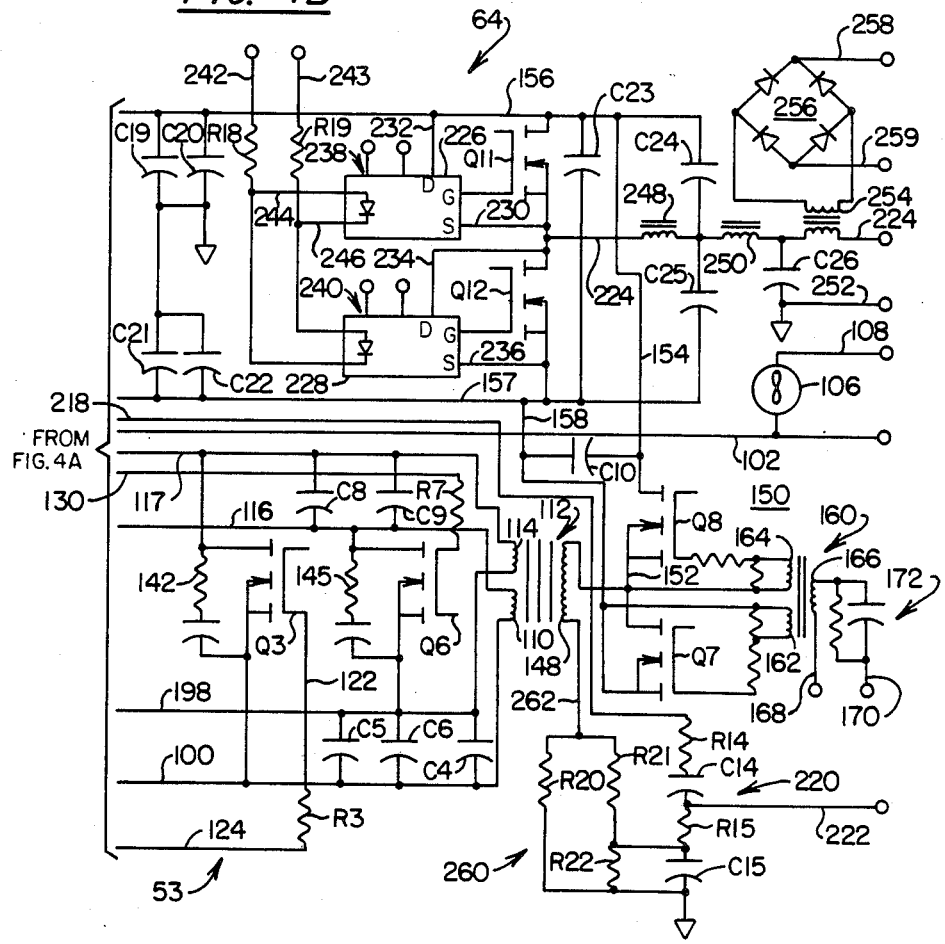

The features represented by blocks 52, 60 and 64 are revealed in an enhanced level of detail in conjunction with FIGS. 4A-4B which should be considered in side-by-side fashion as represented by the labels on each. Referring to FIG. 4A, it may be observed that the battery reservoir function retains the general numeric designation 50, and the d.c.-to-d.c. bidirectional conversion or boosting function again is represented in general by the number 52. FIG. 4A shows that the battery reservoir function 50 incorporates two rechargeable 6 volt batteries represented at 90 and 91. These batteries preferably are of a sealed variety having a gel type electrolyte and are shown coupled across lines 92 and 94. Line 94 extneds to a negative battery rail 100, while line 92 extends through a fuse F1 at line 96 to a positive battery rail 98. A terminal line 95 is shown extending from line 94. Line 92 additionally is shown extending through a fuse F2 to one side of a master on/off switch S1 which closes against a terminal coupled with a line 102 containing a thermal protector 104. Line 102 further extends to line 105 which provides a positive battery supply connection employed by the circuit. As shown in FIG. 4B, this battery supply serves, inter alia, to power the d.c. motor of a small cooling fan 106 which returns to ground through line and connector 108. By powering the fan 106 from the d.c. source, its size advantageously may be diminished and by coupling it to the battery function 50, air circulation needed for operation in the event of utility line failure is provided.

D.C./D.C. Converter

The d.c.-to-d.c. bi-directional converter 52 is represented in both FIGS. 4A and 4B. In its general structure, the converter 52 combines a unique inverter structure 53 with a network 150 representing a synchronous rectifier to develop a boosted d.c. output.

Figure 5:
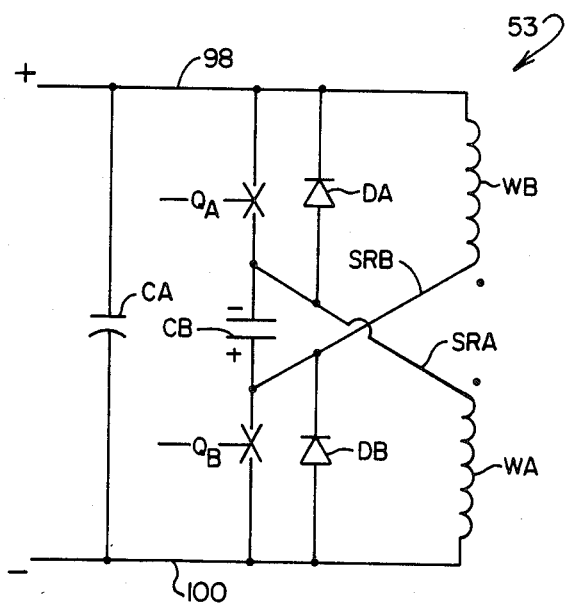
FIG. 5 is a schematic representation of an inverter employed with the circuit of FIGS. 4A and 4B.

Looking momentarily to FIG. 5, a simplified schematic representation of the operational features of the inverter circuit 53 is revealed. The circuit works essentially in push-pull fashion to gain the advantage of a doubling or boosting voltage output and as well, incorporates the advantages of a half-bridge inverter without the attendant disadvantages of either the push-pull or the half-bridge type systems. In effect, a full utilization of the transformer primary windings is achieved and only one switch will occur in series with the current path at any given time. Thus switch occasioned voltage drops are diminished by a factor of one-half. Additionally, a firm clamping action is provided for the inductive spikes developed at turn-off of the switching components. In the figure, the positive and negative battery rails of the inverter again are reproduced, respectively, at 98 and 100. These rails, in terms of high frequency a.c. operation, are shorted together by a capacitor function identified as $C_A$. The primary windings of the transformer involved in the device 52 are represented in the figure at $W_A$ and $W_B$ along with the dots representing identical polarity. The switching functions which are carried out by automotive type MOSFET devices, are represented at $Q_A$ and $Q_B$ and it may be observed that a second capacitor function $C_B$ is coupled intermediate these switches. Of course, many forms of switching techniques will be found adequate for the instant circuit. Two lines which have been designated as "swing rails" are represented at SRA and SRB, while diodes associated with the switching or transistor functions are represented at $D_A$ and $D_B$. In the instant embodiment, body diodes are employed for the function of diodes $D_A$ and $D_B$. With the arrangement shown, the 12 volt battery voltage will appear across capacitor function $C_A$ and, additionally, that voltage will occur across capacitor function $C_B$ in consequence of the coupling of swing rails SRA and SRB through respective winding WA and WB to respective rails 100 and 98. In consequence of both capacitor functions carrying this battery voltage, the switching technique is one where the voltage carried by them is combined in an additive manner to effect the boosting function. It further may be noted that capacitor function $C_B$ also operates to couple winding WA with winding WB in parallel from an a.c. standpoint. In operation, assuming that switch function or transistor function $Q_A$ is on, current will flow from capacitor function $C_B$ into the dot polarity side of winding $W_B$ and thence through switching function $Q_A$ to the negative side of capacitor function $C_B$. Additionally, current will flow from the positive side of capacitor function $C_A$ through switching function $Q_A$ and into winding $W_A$ from the dot polarity side thereof to return to the negative side of capacitor function $C_A$. Thus, current is flowing through both transformer windings with the on condition of a single switching function. Further, that current is being drawn from both capacitor functions $C_A$ and $C_B$. When the transistor or switching function $Q_A$ is suddenly turned off, any leakage reactance within the primary windings that is not coupled into the secondary winding will tend to effect energy storage and a clamping function accommodates for that tendency, an arrangement being provided wherein the voltage can swing back to a finite safe value and current can continue to flow until the energy is dissipated. This inductive effect will cause the dot polarity side of the windings $W_A$ and $W_B$ to assume a negative voltage condition and, as a consequence, the body diode function $D_B$ commences to conduct and the current continues to flow through winding $W_A$ and through diode function $D_B$ and capacitor function $C_B$ and swing rail SRA. Similarly, the energy stored with respect to winding $W_B$ conducts in a path including that winding, capacitor function $C_A$ and the same diode function $D_B$. Thus, the diode function $D_B$ clamps or conducts inductively induced currents from both windings on the noted half cycle of operation. On the next following half cycle, switching function $Q_B$ is turned on and the opposite performance occurs, the system operating between $+12$ v and $-12$ v in conjunction with each corresponding half cycle of operation. Generally, the windings as at $W_A$ and $W_B$ should be bifillar wound to effect the operation wherein both capacitor functions $C_A$ and $C_B$ are employed to drive both windings simultaneously with the actuation of the singular switch.

Returning to FIGS. 4A and 4B, it may be obsered that the two battery rails 98 and 100 are associated or coupled together in terms of high frequency alternating current by a grouping of capacitors C1 through C7 corresponding with earlier described capacitor function $C_A$. FIG. 4B shows that rail 100 is coupled to one end of a primary winding 110 of a step-up transformer represented generally at 112. Winding 110 may be observed to correspond with winding $W_A$ of FIG. 5. In similar fashion, rail 98 extends to one side of another primary winding 114 of transformer 112 which corresponds to earlier discussed winding $W_B$. The opposite end of winding 110 is coupled to a "swing" rail 116, while the corresponding opposite end of winding 114 is coupled to a "swing" rail 117. Rails 116 and 117, as well as corresponding windings 110 and 114 are separated by the battery voltage, but are tied together by a second capacitor function including capacitors C8 and C9, as shown in FIG. 4B, which correspond to capacitor function $C_B$ as described in conjunction with FIG. 5. The switching components of the inverter portion 53 of converter 52 are comprised of two parallel groupings of three power MOSFET transistors, one parallel grouping thereof being represented at transistors Q1–Q3 corresponding to switching function $Q_B$ as shown in FIG. 5 and the other parallel grouping being represented by transistors Q4–Q6 representing the switching function $Q_A$ identified in FIG. 5. A parallel coupling of transistor grouping provides for improved drainsource characteristics for higher current drive capabilities. The gates of transistors Q1–Q3 are coupled via respective lines 120–122 and resistors R1–R3 to line 124 to extend, in turn, to one secondary winding 126 of an isolation transformer 128. The opposite side of winding 126 is coupled to positive rail 100 and a resistor R4 is coupled across the winding. In similar fashion, the gates of transistors Q4–Q6 are coupled through respective resistors R5–R7 and line 130 to one side of secondary winding 132 of transformer 128. A resistor R8 is coupled across that same winding. The two transistor groupings are switched such that one grouping is on while the other is off and there exists a short, deadband interval intermediate switching from one group to the other such that both are off simultaneously for a short interval. Logic providing this drive emanates from the control components represented at block 70 in FIG. 3. Drive input is developed from along lines 134 and 136 which are coupled to either end of primary winding 138 of transformer 128. These drive inputs are alternately reversed and, due to the polarity reversal developed from windings 126 and 132, one grouping of transistors is turned on while the other is held off. Small R-C snubber circuits as at 140–145 provide protection against over-currents in conjunction with respective transistors Q1–Q6.

In keeping with the operational discussion of FIG. 5, it may be observed that when transistor grouping Q4–Q6 is on, current is flowing from the positive side of capacitor grouping C8–C9 and through winding 114, through transistor grouping Q4–Q6 to the negative side of capacitor grouping C1–C7. Additionally, current is flowing from the positive side of the latter capacitor grouping, through transistor grouping Q4–Q6 and winding 110 back to the negative side of capacitor grouping C1–C7. Inductively derived higher currents which occur upon the turning off of transistor grouping Q4–Q6 are dissipated by conduction through the body diodes of transistor grouping Q1–Q3 through winding 110, the noted diodes, through capacitor grouping C8–C9 and thence returning to the winding. The opposite current fow obtains, of course, with the turning on of transistor grouping Q1–Q3. These transistors may be provided, for example, as a type BUZ11S2 marketed by Siemens, Inc.

Transformer 112 (FIG. 4B) performs a step-up function in conjunction with its output winding shown at 148. However, to achieve a boosting effect necessary to derive voltage levels necessary at the node function, the transformer 112 is designed to have a specified amount of leakage reactance, for example, 80 microhenries. This is carried out through conventional pi windings to develop the equivalent of an essentially perfect transformer with an a 80 microhenry choke in series with it on the output. Such structuring saves a magnetic core, as well as the space attendant therewith and provides an improvement in efficiency because only one core is being excited. The feature is employed in a voltage boosting arrangement such that during operation of the d.c./d.c. converter 52 on battery reserve power alone, as the battery voltage diminishes, rail voltage can be maintained within acceptable limits by, in effect boosting the pre-rectified output of transformer 112. Of course, a discrete additional inductor may be employed in place of the leakage reactance.

Secondary winding 148 of transformer 112 is coupled with a halfbridge inverter performing as a synchronous rectifier represented generally at 150 and comprised of two high voltage power MOSFET transistors Q7 and Q8 which are mutually coupled in a half-bridge configuration. In this regard, the source of transistor Q8 is coupled with the drain of transistor Q7 through a junction identified as line 152 which, in turn, is connected to the high end of secondary windng 148. The drain of transistor Q8 is coupled by line 154 to a positive high voltage rail 156 which functions in conjunction with a corresponding negative voltage rail 157 to establish the function of node line 20 as described in conjunction with FIG. 1. Corresponding, the source of transistor Q7 is coupled by line 158 to negative rail 157. Squarewave pulse drive into the gates of transistors Q7 and Q8 is developed through an isolation transformer 160 having secondary windings 162 and 164 and a primary input winding 166. Winding 166 is energized in an alternating polarity sense from lines 168 and 170. A small R-C network as shown generally at 172 is provided for discriminating against d.c. levels, while a capacitor C10 is coupled between lines 154 and 158 to perform as a snubber protecting the half-bridge device 150 from spurious signals and the like.

When the drive input to lines 168 and 170 essentially is in phase coincidence with the driving the inverter operating in conjunction with battery 50, as at lines 134 and 136 (FIG. 4A) then the device 150 performs as a conventional synchronous rectifier. As such, it rectifies the secondary voltage at winding 148 and feeds it to the high voltage rails 156 and 157. However, the signal components described at block 68 in FIG. 3 will be seen to develop a phase lag control relationship based upon node rail (156, 157) voltage and a reference to selectively lag the input at lines 168 and 170 during battery operation with respect to the square wave input submitted at lines 134 and 136 (FIG. 4A). By so varying this relative lag, the system can, in turn, vary the amount of voltage boost developed by the inverter 53. Since transistors Q7 and Q8 are driven switches, at such time as line power is available and the battery voltage commences to fall, the system will perform in a reverse sense, passing power in the other direction to charge battery to its nominally fully charged or "float" value, for example 13.8 volts. As discussed in more detail later herein, it has been found convenient to introduce a 5% lag in inverter 53 to improve the accuracy of control around a nominal 0 relative phase shift between the two components 53 and 150 of this bi-directional d.c./d.c. converter 53. Such an arrangement also improves the control over battery charging, both enhancing battery charge by permitting a lead condition to exist at rectifier 150 and to assure that overcharge of the battery function is avoided.

Input A.C./D.C. Converter

Returning to FIG. 4A, the input converter or conversion device 60 (Fig. 3) is shown to be comprised of power MOSFET transistors or switching devices Q9 and Q10 which may be provided, for example, as type BUZ385 marketed by Siemens Corporation. The drain of transistor Q9 is coupled to high voltage rail 156. This rail, to achieve a conventional 120 v rms a.c. output is maintained at, for example, +200 v d.c. The source of transitor Q9 is coupled to line 174 which, for the present structure, may be considered to have a combined input-output function. The gate of transistor Q9 is coupled to the gate terminal output of a driver circuit 176 via line 178. A source terminal output of circuit 176 is shown coupled to line 174 and the drain terminal output thereof is shown coupled to rail 156 through line 180. In alternate fashion, the drain of transistor Q10 is coupled through line 182 to input-output line 174, while the source thereof is coupled to low voltage rail line 157 through line 184. In correspondence with rail 156, rail 157 preferably is maintained at a −200 v d.c. level to achieve conventional 120 v a.c. output from the system. Gate input to transistor Q10 is provided from a drive circuit 186 from line 188, while the drain output of circuit 186 is coupled to input-output line 174 via line 190. Input inverter drivers 176 and 180 receive a PWM drive signal from lines 192 and 193 incorporating respective resistors R9 and R10. The signals applied from lines 192 and 193 are directed via line 194 and 196 to an opto-coupled actuator within circuit 176, while the corresponding opto-coupling input to driver circuit 186 is provided from the noted lines 192 and 193 in an opposite polar sense. Circuits 176 and 186 are driven in alternating fashion with a dead band delay interval between the turning off of one circuit and the turning on of the other and are powered from a power supply via dual line input represented, respectively, at 198 and 200. These circuits 176 and 186 preferably are structured to perform a current limiting function wherein the source-drain voltage of transistors Q9 and Q10 is monitored as representative of current flow. In the event that current is excessive, then the pertinent transistor is turned off until the next PWM cycle. Details of such circuits are described, for example, in the above-referenced application for U.S. patent entitled "Uninterruptable Power Supply with Energy Conversion and Enhancement" by Powell and Gephart. Converter function 60, when thus driven, provides a squarewave at what normally would be considered its output at line 174. The output is filtered to achieve a sinusoid waveshape through employment of capacitors C11–C12 operating in conjunction with an inductor 202. This sinusoid is developed by a PWM input to lines 192 and 193 which is controlled such that it is synchronized or in phase coincidence with incoming a.c. line power but with an amplitude which is controlled such that when the amplitude reflected into the line power is less than the amplitude of line power energy is passed into the node comprised of rails 156 and 157. For line power employment, the amplitude adjustment is made by comparison of the line input level with a rail error signal selected to achieve a high rail voltage, for example, at ±200 v.

The sinusoidal output of converter 60 as "seen" by the incoming a.c. utility at line 174 will be predominantly resistive in nature in consequence of a relatively large value resistor, R11. This resistor within the line 174 functions to dominate the inductive nature of device 202. Further, a psuedo-resistive effect is achieved as a result of the phase synchronization of the output with the incoming line input. As the size or the capacities of the UPS devices increase beyond the embodiment here described employing amplitude adjustment control, then the addition of inductive control will be beneficial. This is achieved by the assertion of a lag in phase to the confronting output of converter 60 at line 174.

Now looking to the a.c. input to the circuit described earlier at line 62 in conjunction with FIG. 3, line power is introduced via line 204. Line 204 is directed to a triac switching or a.c. control device 206 which, in turn, is controlled from a triac driver 208 represented within a dashed boundary and coupled with the triac device through line 210. Driver 208 is enabled by opto-coupling achieved by applying a d.c. level signal across lines 212 and 213. The output of triac 206 is provided at lines 214, 215, and earlier described input/output line 174. Filtering, comprised of capacitor C13 and resistor R12 extending between lines 204 and 174 is provided to accommodate spurious signals and the like which otherwise may affect the drive of device 206. A ballasting resistor R13 is shown coupled between line 210 and an a.c. tap line 216. Line 216 extends to resistor R13 and line 217 to provide a line proportional signal for use in synchronization for the input drive to the oscillator driving the control input to the inverter at 53. Similarly, a tap for developing control over the system is provided at line 218 which is seen extending to a voltage divider network 220 in FIG. 4B. Network 220 is formed of resistors R15 and R16 performing in conjunction with capacitors C14 and C15 and provides the requisite portional output of the a.c. line input at line 222.

Returning to FIG. 4A, auxiliary output electrical receptors or plugs are provided with the device 34 (FIG. 2) by connection with line 215. Thus, these auxiliary outputs are enabled by a.c. control or triac 206. when the unit is off, the receptacles will be disabled.

Output D.C./A.C. Converter

Under conditions of normal operation, power will be supplied to the system for a.c. line 204 and thus, the control over converter 60 will be such that the mirrored sinewave reflected into the a.c. input will have an amplitude selected below the amplitude of the incoming line power. This energy is converted by converter 60 to a d.c. form and is stored in a sequence of capacitors identified at C18–C23 shown coupled to d.c. rails 156 and 157 in each of FIGS. 4A and 4B. The output d.c.-to-a.c. converter described in conjunction with FIG. 3 at 64 is again represented in general by that numeral in FIG. 4B and is seen to be structured essentially identically with the input converter 60. In this regard, the inverter 64 is formed as a half-bridge inverter incorporating two MOSFET transistors Q11 and Q12 which may be provided, for example, as the above-noted type BUZ385. Transistors Q11 and Q12, as before, are coupled across rails 156 and 157, the drain of transistors Q11 being coupled to rail 156, while the source of transistor Q12 is coupled to rail 157. The source and drain terminals of respective transistors Q11 and Q12 are coupled with output line 224 and their gates are coupled to respective driver circuits 226 and 228. Driver circuits 226 and 228 are structured identically with those described earlier at 176 and 186 in conjunction with FIG. 4A. In this regard, the source of transistor Q11 is coupled to the corresponding terminal of driver circuit 226 through line 30, while the drain terminal thereof is connected to rail 156 through line 232. In similar fashion, the drain of transistor Q12 is coupled to the corresponding terminal of circuit 228 through line 234, while the source of transistor Q12 is connected to the corresponding source terminal of circuit 228 through line 236. Circuits 226 and 228 receive logic level power inputs from respective dual line grouping 238 and 240 and, additionally, receive PWM logic switching inputs from the signal components discussed in connection with block 68 of FIG. 3 from lines 242 and 243. Note that these lines extend through respective resistors R18 and R19 to an opto-coupling within driver circuit 228 and through additional respective lines 244 and 246 to an opto-coupling within driver circuit 426. The polarities of the optocouplings are reversed such that the drive is complementary in that first one transistor as at Q11 is turned on following which a dead band interval occurs where no transistor is turned on following which transistor Q12 is turned on. To achieve a consistent output at line 224, the PWM drive at lines 242 and 243 is developed in correspondence with the voltage difference between node rails 156 and 157. In this regard, it is desirable to maintain the rails at one higher level of d.c. voltage for line energization, for example, ±200 v. However, when the energy of the battery reservoir 50 is called upon to supply output, then it is desirable to operate at a lower rail voltage, for example, ±170 v. The output at line 224 is formed as a sinusoid by a filter including inductor 248 and capacitors C24 and C25. This output further is RF filtered in view of the switching frequencies of the system by the combination of capacitor C26 and inductor 250. Thus, the output of the system is provided at lines 224 and ground line 252. As noted earlier in conjunction with display 36 of the device 34 in FIG. 2, a bar graph is employed to show the extent of current flowing within a given load. To provide the siganl to this annunciator function, a current transformer 254 functioning in conjunction with a full-wave bridge 256 supplies the requisite d.c. level signal to the annuciator function via lines 258 and 259. LED 40 as shown in FIG. 2 illuminates when the level at outputs 258 and 259 represents an overload condition.

Offset Correction Network

FIG. 4B also reveals an offset correction netowrk 260 which is coupled by line 262 to one side of the secondary winding of transformer 112. Operational experience with the devices at hand indicate that a loop condition may develop where slight unbalance in the drives of the switching components occurs which will, in turn, evolve an unbalance in the symmetry of the squarewaves which are generated. This, in effect, produces a small d.c. offset which may accumulate from component to component. The net effect is to draw direct current from the utility and pass it through the inverter functions. To correct for this, a voltage is developed across resistors R20–R22 and a portion of that d.c. phenomenon then is applied back to the input function 60 in the form of a d.c. cancellation or by its correction. Recall that the function of the converter at block 60 (FIG. 3) is to mirror back the signal purporting to emanate from the utility at line 204 (FIG. 4A), i.e. the system is mirroring back a direct current level that is equal and opposite to the direct current which the unit is creating. This evolves a cancellation and the unit draws no more current than it actually needs to provide essential energy conversion.

Control Components 70

Figure 6:
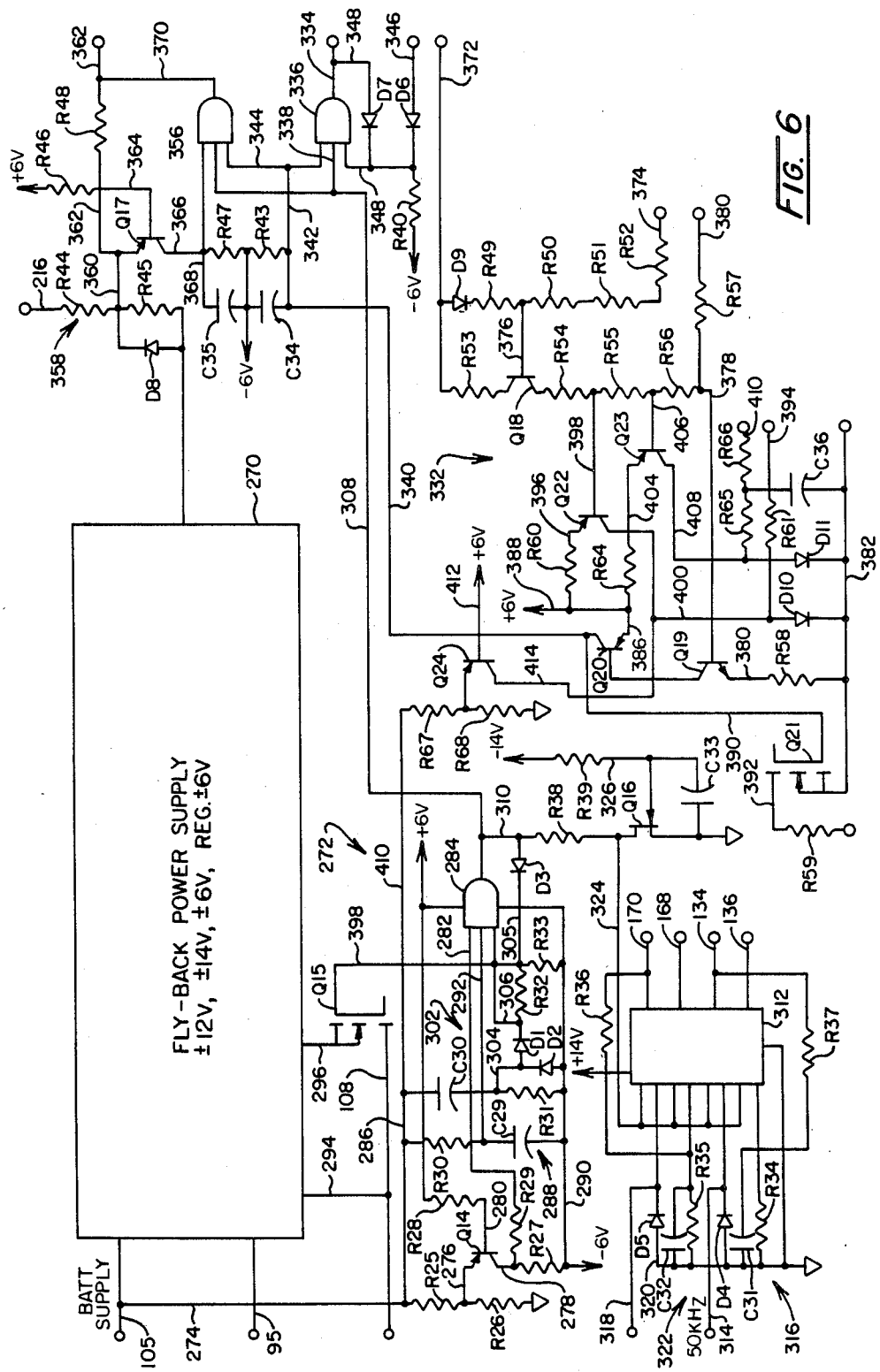
FIG. 6 is a schematic circuit diagram of the control components of the invention shown in block form in FIG. 3.

Referring to FIG. 6, the control components described generally in conjunction with block 70 in FIG. 3 are revealed in electrical schematic fashion. This control function 70 contains a power supply which may be of a conventional fly-back variety, as represented at block 270. The inputs to the power supply 270 are those provided from the battery function 50 and, accordingly, input line 105 again is reproduced from FIG. 4A providing a plus battery supply input, while correspondingly, the negative side of the battery input to the power supply 270 is provided from earlier-described line 95. In general, the power supply 270 provides, as labelled +12 v supplies which are developed in mutual isolation as power for the four current limiting drive circuits 176, 186, 226 and 228. Additionally, general power is supplied to the circuits from ±14 v outputs, a relatively unregulated ±6 v output is provided and, a precision regulated ±6 v is derived as part of the power supply but may be incorporated with other component groupings in the interest of packaging convenience. Generally, the power supply is designed in conventional fashion and will develop an output when the voltage levels of the battery are quite low, for instance as low as 5 v. With such an arrangement, the system is capable of entering into a battery charging operation drawing power from the utility line input after a battery powered performance.

As discussed in conjunction with FIG. 4A, master switch S1 is employed to actuate the entire system. However, mere closure of this switch will not immediately enble the system, a protective protocol being imposed such that the proper functions are initially enabled and the entire system is inhibited for an initial interval of about one second by a start-up timing network represented generally at 272.

Start-Up Network

One evaluation made in conjunction with network 272 is that of determining the presence of adequate battery voltage level. In this regard, it may be observed that the positive side of the battery supply at line 105 leading to power supply 270 is tapped by line 274 which is coupled to ground and includes divider resistors R25 and R26. Resistors R25 and R26 are tapped at their midpoint by line 276 extending to the emitter of PNP transistor Q14. The collector of transistor Q14 extends via line 278 and resistor R27 to −6 v, while the base thereof is coupled through line 280 and resistor R28 to +6 v to provide a thresholding form of comparison such that the transistor is turned on whenever battery voltage is above about 11 volts under the very small or no load condition in existence at start-up. However, under load or during operation, a hysteresis condition obtains such that transistor Q14 will turn off following start-up if the battery level drops to about 9 volts. When the transistor Q14 is on, a logic positive level is asserted via line 282 incorporating resistor R19 and coupled to line 278 which extends to one input of a three input AND gate 284. Thus, one condition for start-up, battery level adequacy, is provided with a logic high level at the line 282 input to gate 284.

Network 272 also develops a one second start-up delay commencing with any given closure of the master switch S1. Thus, upon closure of switch S1 and the application of battery supply through line 105, that voltage will be impressed via lines 274 and 286 to energize an R-C network represented generally at 288 and comprised of resistor R30 and capacitor C29 coupled between line 286 and −6 v line 290. Network 288 is tapped by line 292 which, in turn, is directed to a second input of AND gate 284. Thus gate 284 is enabled, at the earliest, following this one second start-up delay.

Power supply 270 is enabled as a consequence of bringing line 294 to ground as represented by the negative terminal output of the batteries at line 95. To so condition line 294, a MOSFET power supply transistor Q15 is provided having its source coupled via line 296 to this negative or ground made available from line 95, while its drain is coupled via line 108 to line 294. Thus, when the gate of transistor Q15 is made positive as controlled from line 108, lines 298 and 294 will be connected with ground. It may be observed that line 108 functions as the ground terminal to the d.c. fan 106 as described in conjunction with FIG. 4B. The fan thus operates upon the enablement of the power supply and the closure of master switch S1.

A positive gating input is provided at line 298 to transistor Q15 upon the closure of master switch S1 and the application of a positive voltage supply to an R-C network represented generally at 302. Incorporating capacitor C30 and resistor R31 between lines 286 and 290, the tap of network 302 at line 304 will, at the outset, carry the battery voltage level, for example about +12 v until such time as the initial charge on capacitor C30 decays, an interval generally requiring about two seconds and selected as being longer than the start-up time out or delay of one second described in conjunction with network 288. Line 304 is shown incorporating diode D2 and extending to line 290. The line is tapped by line 305 containing resistor R32 and diode D1 and the latter line is tapped by line 306 extending to the third input of AND gate 284. Thus, with the initial closure of master switch S1, the third input terminal to AND gate 284 is at a logic high value and, assuming all other conditions are met in determination of start-up timing of one second, a logic high output will be provided at line 308. This logic high level at output line 308 is introduced to line 310 which, in turn, introduces the signal through diode D3 within line 305 to line 298 leading to transistor Q15 and line 306 and the third input to gate 264. Thus, transistor Q15 is retained in an on state and the third input to gate 284 is latched to a logic high condition.

The protocol of successive enablement of the functions of the circuit of the instant device requires that, following the above-described enablement of the power supply 270, the system is initially brought up to working voltage levels from the battery power supply through the enablement of the d.c.-to-d.c. converting function as described in conjunction with block 52 of FIG. 3. Battery power is continuously asserted at the switching functions represented at transistors Q1–Q8 of this converter and, thus, an assurance must be made that no spurious drive signals reach this switching function before full and controlled operation is under way. It may be recalled that drive into the inverter switching transistors Q1–Q6 is described in conjunction with FIG. 4A as being asserted through terminal lines 134 and 136 and transformer function 128. To provide for this drive, a booster amplifier driver circuit is included which is represented in FIG. 6 at 312. Provided, for example, as a quad MOSFET driver type D469 marketed by Siliconex, Inc., the drivers 312 provide outputs at lines 134 and 136 and 168 and 170 corresponding to the same drive inputs as set forth in FIGS. 4A and 4B. The input to the inverter drive is provided from line 314 as a 50 KHz squarewave signal. This signal is provided with a deadband interval between the outputs at lines 134 and 136 by virtue of an R-C network comprised of capacitor C31 and resistor R34 performing in conjunction with diode D4. In similar fashion, the output switcher driver terminals 168 and 170 are driven from a phase controlled squarewave input asserted at line 318 and into the circuit 312 via line 320. As before, a deadband interval between the excitation of lines 168 and 170 is provided by an R-C network represented generally at 322 which includes capacitor C32 and resistor R35.

To assure that no spurious signals may be introduced to the circuit 312 during the period of start-up of the apparatus, a selective enablement is provided thereto from along line 324. Line 324 responds to the output of network 272 at line 310 by virtue of its connection therewith through resistor R38. However, this enabling signal at line 324 is under the control of a JFET transistor Q16. The drain and source terminals of transistor Q16 are connected within line 310 between line 324 and ground, while the gate thereof is coupled via line 326 and resistor R39 to −14 v supply. A capacitor C33 also couples line 326 to ground. With the arrangement, transistor Q13 inhibits the enabling signal development at line 324 by maintaining what, in effect is a short circuit to ground until the voltage witnessed at the power supply and corresponding with that asserted at the driver circuits is at about a −10 v level. At such time, the transistor Q16 open circuits to permit an enablement signal to occur at line 324. Thus, any spurious enablement signals developed at lines 308 and 310 from the network 272 are isolated by the performance of transistor Q16 until such time as the power supply has essentially developed to full performance. This has been found to provide a necessary protection for the switching components Q1–Q8.

Automatic Shutdown

To assure protection of the batteries 90 and 91 of the reservoir function 50 described in conjunction with FIG. 4A, an "automatic shutdown" feature is incorporated in the operation of master switch S1 and start-up timing network 272. This feature requires that the switch S1 be turned off and then turned on again before the system can be enabled. It may be noted that during operation under battery power, eventually the batteries will be discharged under load to a level considered minimum for maintaining them in condition for proper recharge and for maximizing their lifespan. This level may be selected, for example, as about 9 volts. Where the detected battery voltage level falls below that threshold, transistor Q14 will be turned off inasmuch as it becomes reverse biased, the detected battery voltage at line 276 being lower than the reference. In consequence, line voltage reverts through resistor R27 to the −6 v level and the logic high output at line 282 directed to one input of AND gate 284 is converted to a logic low. As a result, all enablement signals disappear by removal of a logic high value at line 308. Assuming switch S1 to remain on, capacitor C30 of network 302 will have remained discharged toward −6 v at line 290 and the output latch incorporating lines 308, 310, and diode D3 will have been removed with the initial loss of signal at line 308. Thus, the apparatus will not be enabled until such time as switch S1 is turned off to permit the return of capacitor C30 to a neutral or uncharged condition. Reactuation of switch S1 then will start the apparatus in the manner initially described. Very often, personal computers with which the instant apparatus may be employed will be turned on to generate reports on an overnight basis. Should power be lost due to thunderstorms or the like for a period longer than that selected for UPS operation, for example 20 minutes depending upon load, then some form of battery shutdown is needed to avoid excessive discharge. The sealed, lead acid batteries employed with the system are somewhat expensive and the instant shut-down technique thus becomes quite valuable to the operator. When the operator returns to the computer utilizing the instant apparatus, for example upon the return of power or on the next day, then adequate power remains in the batteries to bring the node to operating voltage and effect battery recharging control by the phase lagging signal input at line 318 with respect to the phase input at line 314.

Output Enablement

Under the noted start-up protocol, the circuit also responds to a variety of monitored conditions associated with the node 20 as represented by rails 156 and 157, as well as to the condition and phase of the utility or a.c. line input. Normally, the output converter function represented at block 64 in FIG. 3 is enabled or activated first in conjunction with an enabling output at line 334 developed from three input AND gate 336. One input to gate 336 is developed as the enabling output of start-up timing network 272 which is presented to the gate from lines 308 and 338. Gate 336 also receives an input via lines 340, 342 and 344 from network 332 evidencing the presence of at least a 300 v voltage span between rails 156 and 157. This voltage range approximates that preferably selected for minimum operation under battery power as described above. A filter comprised of capacitor C34 and resistor R43 is provided for the signal asserted from line 344. The third input to gate 336 is derived from the siganl circuit discussed in conjunction with FIG. 3 at block 68 and corresponds with an a.c. input waveform from the on-board oscillator 420 (FIG. 7). This signal is fed through line 346 containing diode D6 and resistor R40 which, in turn, is coupled to −6 v. The cross-over signal from line 346 is coupled to gate 336 through lines 348. Thus, upon the occurrence of an enabling output from start-up timing network 272, the development of a node voltage responsive signal or "300 v present" signal at line 340 and the detection of a zero crossover at the onboard oscillator 420 (FIG. 7) via line 346, a short term logic high enabling signal is generated at output line 334. This output is maintained by a latch arrangement including line 340 and diode D7. The resultant enabling signal at line 334 functions to enable the drive gates providing PWM signals to the output converter drivers.

Input Enablement

The enablement of the input converter represented at block 60 in FIG. 3 is developed under different considerations. As noted above, the system is brought into operation initially under battery power. Thus, enablement occurs after the output inverter enablement signal is developed at line 334. Enablement of the input inverter is logically developed at three input AND gate 356 which is seen to receive the start-up timing signal enablement from network 272 as developed from line 308. Additionally, a second input to gate 356 is the 300 v Present signal developed from network 332 and lines 340, 342 and 344. Finally, the logic at gate 356 requires the presence of a predetermined voltage at the input power line, for example about 100 v. The latter information is developed by an a.c. source evaluation network 357 from a tap of the a.c. line as earlier described at line 216 in conjunction with FIG. 4A. Line 216 again is reproduced in FIG. 6 and is seen to extend to a voltage divider network 358 formed of resistors R44 and R45. A diode D8 extends across resistor R45 to the central tap of the network 358 at line 360. Line 360, extends to line 362 which is coupled to the emitter of PNP transistor Q17. The base of transistor Q17 is coupled via line 364 and resistor R46 to a +6 v reference and the collector thereof is coupled through lines 366 and 368 to a capacitor C35 which is associated with a bleed resistor R47. With the arrangement shown, when any given positive half cycle of the a.c. input at line 216, as adjusted by divider network 358, exceeds the noted reference voltage, it will be passed in pulsed fashion through transistor Q17 to accumulate as charge at capacitor C35. Generally, following a time interval which is fairly lengthy, i.e. representing the range of 10 to 15 cycles of an acceptable a.c. input, a sufficient voltage will be developed at line 368 to provide an adequate logic high level or source status signal at the third input to gate 356. Thus, with the presence of logic high inputs at each of lines 308, 368 and 344, a logic high enabling output is provided at the output lines 370 to gate 356. This output is conveyed by line 362 through resistor R48 to the emitter of transistor Q17 to provide about a 10 v hysteresis input to the a.c. line detect components, thus avoiding any chatter under conditions where the a.c. line input is very near the critical or threshold voltage required by this evaluation circuit.

Node Monitoring Circuit

Turning to the node monitoring circuit 332, the node rails as shown in FIGS. 4A and 4B at 156 and 157 are tapped by respective lines 372 and 374 which extend to a form of voltage divider comprised of diode D9 and series connected resistors R49–R52 which function in the manner of a current source or mirror. With the arrangement, a fraction of the entire voltage is applied through line 376 to the base of PNP transistor Q18 the emitter of which returns through resistor R53 and diode D9, the latter being selected to match the diode drop of the emitter base junction of transistor Q18. Thus, voltage is developed across resistor R53 which is equal in magnitude to that voltage across resistor R49. The collector of transistor Q18 returns through a voltage divider or attenuation network comprised of resistors R54–R56 in line 378, as well as resistor R57 within line 380. The signal at line 380 is developed as a current, for example having a value of 1 milliamp for a 400 v range between the node rails 156 and 157 as shown in FIGS. 4A and 4B. The resultant output at line 380 is employed as a signal proportional to the span of voltage across the node rails 156 and 157, that current essentially being mirrored by the current through transistor Q18. The resistances at hand, particularly those selected at resistors R28 and R29 are provided such that the voltage at line 378 will be one diode drop above ground when the voltage across rails 356 and 357 is 300 v, i.e. 0.75 milliamps will flow through the voltage divider for that battery operational level. Lilne 378 is coupled to the base of NPN transistor Q19 and, thus, the presence of the noted voltage representing 300 v at the rails 156 and 157 functions to forward bias the base emitter junction of transistor Q19. The emitter of transistor Q19 is coupled through line 380 and resistor R58 to line 382 which, in turn, extends to system ground as defined at line 95 in FIG. 4A. The collector of transistor Q19 is coupled via line 384 to the base of PNP transistor Q20, the collector of which is coupled to line 340 and the emitter of which is connected to +6 v via lines 386 and 388. When transistor Q9 is turned on, transistor Q20 is drawn into conduction, its collector being pulled to the noted +6 v value and thus providing the earlier-described "300 v Present" signal at line 340. The collector of transistor Q20 additionally is coupled by line 390 to the gate of MOSFET transistor Q21. The source of transistor Q21 is coupled to line 382, while the drain terminal thereof is coupled to line 392 containing resistor R59. Line 392, in turn, is coupled with line 213 of the opto-coupler 208 functioning to enable the triac 206 as shown in FIG. 4A. Thus, the logic high signal at line 340 representing the presence of adequate node voltage at rails 156 and 157 is employed to enable the triac 206 to permit the circuit to commence utilizing a.c. line power, assuming that power is present and adequate. It may be observed in FIG. 4A, that the auxiliary outlets as powered from line 215 additionally are enabled at this point in the start-up protocol. Accordingly, these unprotected auxiliary outlets may be connected with the line at any time the apparatus is powered up whether working on battery or otherwise.

At the commencement of start-up, the synchronous rectifier 150 will be in a phase lagging relationship with respect to the inverter 53 with which it performs in component 52. To assure a maximum phase lag for bringing rails 156 and 157 to their targeted 300 v battery operational range, a battery node output signal is developed within network 332 at line 394 representing a maximum phase lag command. This signal is generated from PNP transistor Q22 the emitter of which is coupled through resistor R60 and line 396 to line 388 and a +6 v reference. The base of transistor Q22 is coupled by line 398 to the junction between rail voltage responsive resistors R54 and R55. Thus, at the commencement of a start-up procedure, transistor Q22 essentially is fully conductive and its collector, which is coupled with line 400 and which extends through resistor R61 and thence to line 394 will provide a maximum output current. Line 400 is clamped to ground line 382 through diode D10. As the battery operational level of 300 v across node rails 156 and 157 is crossed and the node rail voltages approach battery operational levels, i.e. about ±175 v, the voltage level intermediate resistors R54 and R55 will approach a 6 v level functioning to commence turning off transistor Q22 and lowering the amplitude of the signal at line 394. As a consequence, the phase lag condition at synchronous rectifier 150 diminishes.

A similar amplitude control is achieved at network 332 in conjunction with PNP transistor Q23, the emitter of which is coupled via line 404 and resistor R64 to a +6 v reference and the base of which is coupled by line node output line 406 to the junction between resistors R55 and R56. As a consequence of this coupling configuration, the transistor will conduct in accordance with the reference and line node output relationship and thus provide an output signal through line 408 and resistors R65 and R66 within line 410 representing an amplitude command for drawing significant power from the utility line input at line 204 (FIG. 4A). Line 408 is seen to be clamped through diode D11 to ground line 382 and a capacitor C36 is shown coupled between the junction of reistors R65 and R66 to ground. As power from the utility line is applied to the system, its application to the node rails 156 and 157 is controlled from transistor Q23, a maximum level of such input being controlled by the clamping diode D11, and the battery regulating voltage level, for example of 300 v, will be passed. As that level is passed, transistor Q22 becomes completely back biased to establish a 0 phase lag relationship at the synchronous rectifier 150 to terminate the contribution of battery power. As described later herein, the phase relationship at synchronous rectifier 150 is relative in nature and a slight lead condition will be seen to be preferred to achieve control over zero point operation. However, as the 400 v predetermined power line operational level voltage span for node rails 156 and 157 is reached, the voltage level intermediate monitoring resistors R55 and R56 reaches a level tending to back bias transistor Q23 to diminish the amount of amplitude differential between the incoming power waveform and that reflected to it by the input converter or inverter device 60.

To avoid a potentially damaging overcharge of the batteries at 50 above their designated "float" voltage level, for example 13.8 v, a protective network is provided which functions to monitor battery voltage and control the phase lag-lead relationship between the synchronous rectifier and inverter 53. This over-voltage protection is provided by a PNP transistor Q24 the emitter of which is coupled intermediate voltage divider resistors R67 and R68 coupled between line 286 and ground. Thus line 286 carries the instantaneous battery voltage which is adjusted in value by the resistors R67 and R68. The base of transistor Q24 is coupled via line 412 to +6 v reference, while the collector thereof is coupled by line 414 to line 400. Accordingly, should the battery voltage commence to exceed its designated float value, a current will be imposed at line 414 which will command a phase lagging relationship to be established at synchronous rectifier 150 to diminish the charging of the battery.

It may be observed that if the line power is diminished or lost, the monitoring system including transistors Q22 and Q23 will automatically assume a condition wherein the system will revert to performance under the power of batteries 50 at a designated battery operational node rail voltage span, for example of about 300 v. Correspondingly, as utility power is restored, the lag condition at synchronous rectifier 150 will be terminated to a slight lead condition for battery charging and control from transistor Q23 will be asserted to bring the node rails 155 and 157 to the line operational selected voltage, for example ±200 v.

Signal Components 68

Referring to FIG. 7, the circuit components contained within the signal circuit function represented at block 68 in FIG. 3 are illustrated at an enhanced level of detail. The circuit 68 includes an R-C phase shift type oscillator represented generally at 420 and shown being coupled with common ground line 95 as well as the attenuated a.c. signal at the triac 206 input and shown at line 217 (FIG. 4A). Lines 217 and 95 are reproduced in conjunction with the oscillator 420 which is shown to be formed having an input operational amplifier, for example a type LM358 as shown at 422, the output of which at line 424 is directed to the input of a type CD 4049 inverter 426. The output of inverter 426 at line 428 extends through a sequence of phase shifting treatment stages including variable resistor R70 and resistors R71-R73 which perform in conjunction with capacitors C40-C42 coupled between line 428 and ground line 95. Line 428 extends to one input of a second operational amplifier 430 the output of which is provided at line 432. A feedback path including resistors R74 and R75 operating in conjunction with line 434 and capacitor C43 extends to the opposite input of amplifier 430. From line 432, a feedback line including resistor R76 extends to a summing point at line 217 and input resistor R77. A resistor R78 is shown coupled between line 217 and ground line 95. With the phase shift type oscillator shown, as the utility power asserted at line 204 (Fig. 4A) is applied, a small current in phase with that utility voltage is applied at line 217 through resistor R77. If that current leads or lags the established 60 Hz signal of the oscillator 420, then the oscillator will respond at the noted summing point and move into phase with the incoming line power. However, at such time where no current is present at line 217, representing a line power failure, the oscillator 420 will free run at a preselected operational frequency, generally chosen as 60 Hz. The squarewave output of amplifier 422 of the oscillator at line 424 is tapped at line 436 which contains resistors R79 and R80 as well as capacitor C44 and is coupled to +6 v. With such a configuration, a cross-over signal as inverted at 438 is developed at line 346. As described earlier in conjunction with line 346, leading to enabling gate 336, this cross-over pulse signal is used in the enabling logic of the output inverter 64.

The output of oscillator 420 at line 432 is directed through a blocking capacitor C45 which functions to eliminate any d.c. levels, whereupon the oscillatory output is directed through resistor R81 and variable resistor R82 which are provided for amplitude adjustment. A capacitor C46 is provided for the purpose of high frequency noise suppression, while a capacitor C47 in line 440 extending from the wiper arm of variable resistor R82 provides similar signal treatment. Line 440 is directed to one input of a comparator 442 and serves as one component of a PWM output developed therefrom.

The other required input for the PWM signal generating technique is developed through the derivation of a high frequency triangle waveform. These triangular waveforms are generated with the instant embodiment through the use of a master triangular waveform generator represented generally at 444 and a similar generator which is slaved to the former and is represented at 446. Each of these oscillators is an R-C phase shift type establishing a base frequency, for example, of 50 KHz. The oscillators employ an operational transconductance amplifier, for example marketed as type CA3080 marketed by RCA and shown at 448 in conjunction with oscillator 444. Amplifier 448 develops a current source form of output at line 450 which, up to a maximum value, is equal to the input bias current asserted from line 410 through resistor R85. Line 450 extends through resistor R86 to the gate of MOSFET transistor Q27. The drain terminal of transistor Q27 is coupled to +6 v, while the source thereof is coupled via line 452 to line 454 which, in turn, extends to a phase shifting network at lines 456 and 458 which incorporates capacitors C48 and C49 in conjunction with resistors R87 and R88. Line 458, as well as the non-invertion input to amplifier 448 are coupled to common ground via line 460 and the squarewave output of the amplifier at line 450 serves to charge and discharge a capacitor C49 within line 462 in an integrating type manner wherein a triangular voltage, is developed. Transistor Q27 performs in the manner of a source follower and, accordingly, develops a corresponding triangular voltage output appearing across resistor R89 within line 464 returning to −6 v supply. Because of the 90° phase shift necessarily occasioned with the charging and discharging of capacitor C49, and accounting for the inversion occasioned with the passage of feedback signals to amplifier stage 448, the values of resistors R87 and R88 as well as capacitors C48 and C49 are chosen to evoke an offsetting 90° phase shift. The amplitude of the output triangular waveshape at line 454 is controlled by the level of current at line 410 which is filtered at resistor R85 and capacitor C50. At the current at that line is increased, the corresponding amplitude of the square wave output at line 450 increases proportionately to effect development of the triangular waveform of higher amplitude. Of course, the opposite holds true to provide a control technique over the PWM signal ultimately developed.

Slave triangular waveform generator 446 also contains a transconductance operational amplifier 466 which, instead of a phase shift feedback, receives a synchronizing output from stage 444 via lines 454, 468 and coupling capacitor C51. The non-inverting input to amplifier 466 is provided from lines 460 and 470. With the arrangement shown, the rail voltage proportional current signal developed as described at line 380 in FIG. 6 is asserted as represented in FIG. 7 whereupon it is filtered and corrected in terms of level by capacitor C52, resistors R90 and R91 and diode D13 within line 472. Amplifier stage 466 generates a squarewave output at line 474 the amplitude of which is proportioned to the input at line 380 and this output is converted to a triangular waveform by virtue of the connection of capacitor C53 thereto by line 476 which, in turn, couples to line 460 and ground. The amplitude of this triangular waveform will vary in accordance with the level of signal asserted at line 380 and is presented through resistor R92 to the gate of MOSFET transistor Q28. The drain of transistor Q28 is coupled to +6 v, while the source thereof is coupled to line 454 incorporating resistors R93 and R94 and, in turn, connected to −6 v. Acting, as before, as a source follower and having a frequency or period coincident with waveform generator stage 444, the output of stage 446 is presented at line 478 for presentation through blocking capacitor C54 to the opposite input of comparator 442. Resistor R95 provides a ground return and d.c. control with respect to comparator 442. The output of comparator 442 and line 480 is a rectangular wave developed to provide pulse width modulated (PWM) drive to the output inverter driver 226 and 228 (FIG. 4B). Line 480 is shown directed to line 482 which is coupled to +6 v through pull-up resistor R97 and which is coupled to one input of a NAND Schmitt trigger 484 which may be provided, for example, as a type 4093. Trigger 484 functions to improve or square-up the waveshape asserted thereto and, additionally, responds to the enabling signal developed from gate 336 and line 334 as described in conjunction with FIG. 6. Accordingly, line 334 again is reproduced in the instant figure. The output of gate 484 is provided at line 486 to be inverted at inverter 488 and asserted at earlier-described (FIG. 4B) line 242. Line 486 is tapped by line 490 which is directed through resistor R98 to line 492 containing capacitor C55. Line 492 extends to one input of Schmitt-type NAND gate 494, the opposite input to which is developed from line 496 which carries the enabling signal from line 334. With the arrangement shown, resistor R98 and capacitor C55 function to provide a small delay representing a dead band interval of about 500 nanoseconds between the turning off of gate 484 and the turning on of gate 494. When so turned on, gate 494 provides a corresponding output at line 498 which is inverted at inverter 500 for presentation at earlier-described line 243 (FIG. 4B). The output of line 486 thus is 180° out of phase with respect to the output at line 498 along with a small phasing difference represented by the dead band interval. Inasmuch as the light emitting diodes of the optocouplers as shown connected via lines 242 and 243 in FIG. 4B are electrically associated in inverse parallel fashion, this drive arrangement then provides for their alternate energization along with the noted dead band interval. Note that the dead band interval is balanced inasmuch as only one time delay circuit is employed for both LED excitations.

It may be recalled that the enabling or inhibiting signal at line 334 is one which is developed only after the power supply is brought up, a time delay has occurred for start-up to permit the oscillatory functions to stabilize and a zero crossing with respect to oscillator 420 has been detected. Until these conditions are met, the signal at line 334 is held at a logic low.

The output of master triangular waveform generator 444 at line 454 is seen to be directed through d.c. blocking capacitor C56 to one input of a comparator stage 502. Resistor R96 provides a ground return and d.c.

control with respect to comparator 502. Line 504, the output of stage 502 is coupled through pull-up resistor R99 to +6 v and through line 506 to one input of NAND Schmitt trigger 508 serving to output PWM drive to the drivers associated with the input inverter or converter stage 60. Accordingly, the opposite input to comparator 502 is derived from line 222 through resistor R100 and, as described in conjunction with FIG. 4B, line 222 represents or mimics the utility a.c. line input to the apparatus in appropriately scaled dimension. Thus, the comparator 502 functions to evolve a signal which mirrors back the incoming input but with a variation in amplitude as determined by the value of current at line 410. This signal then is asserted through the impedance represented at resistor R11 in line 174 as shown in FIG. 4A. The opposite input to gate 508 is an enabling one which, as described in conjunction with FIG. 6 and line 362, represents an assurance that adequate line power is present; further that there exists at least a 300 v range across the rails 156 and 157; and that the start-up timing procedures have been carried out. With the presence of all of these conditions, then line 362 carries a logic high value which is asserted at the second input of gate 508 from line 510 to present a rectangular wave output at line 512 which is inverted at inverter 514 for presentation at line 193. As before, line 512 is tapped by line 516 containing resistor R101 and extending to line 518 containing, in turn, capacitor C57 and coupled between the input of NAND Schmitt type trigger or gate 520 and −6 v. With the arrangement shown, the rectangular waveform output of gate 520 at line 522 will be 180° altered in phase from the output at line 512 and, additionally, the phase lagging effect of resistor R101 and capacitor C57 will provide a dead band interval between the waveforms of lines 512 and 522. Line 522 is seen to be directed to the input of an inverter 524, the output of which is directed to line 192. Lines 192 and 193 have been described in conjunction with FIG. 4A as extending to driver circuits 176 and 186.

The high frequency, 50 KHz, signal developed by the master oscillator stage 444 also is employed to provide high frequency drive inputs to the inverter stage and synchronous rectifier stage of the d.c.-to-d.c. converter 52. In this regard, the triangular waveshape output at line 454 of stage 444 is tapped through capacitor C60 at line 526 and thence passes along line 528 containing resistor R102 and is asserted at one input of a comparator 530. for providing a squarewave output at line 314 which is in synchronism with the period of the triangle waveform output of the master triangle waveform generator stage 444. The squarewave output at line 314 is directed through resistor R103 and is pulled up via resistor R104 and +6 v. The high frequency output is used, as earlier described in conjunction with line 314, to drive the inverter component 53 of d.c.-to-d.c. converter 52. To facilitate the control over this converter 52 with respect to the zero point between the phase of the inverter component and rectifier component, a slight lag, for example 5°, is imposed upon the squarewave signal emanating from line 314. This lag, which translates to a phase lead as seen by the synchronous rectifier at its output, is inserted through resistor R105 in line 532 performing in conjunction with resitor R106 in a feedback line extending from line 314 to line 532. Inasmuch as the control over the synchronous rectifier is one imposing a select phase lag, the imposition of this input lead in phase represents a condition which is relatively easily controlled. Additionally, the slight lead may be employed to enhance the rate of charge of the battery function 50 when that operation is called for. The high frequency or 50 KHz output of master triangle waveform generator stage 444 also is tapped by line 534 and is coupled through capacitor C64 to one input of a comparator 536. The opposite input to comparator 536 is coupled via line 538, resistor R107 and line 532 to ground. Thus, without more, the output of comparator stage 536 which is pulled up through resistor R108 to +6 v and presented through resistor R109 represents a squarewave signal slightly leading the corresponding signal at line 314. However, a portion of the output at line 318 is divided by resistors R10 and R11 and respective lines 540 and 542. This signal at line 540 is directed to the non-inverting input of a transconductance operational amplifier 544 of type CA3080. The inverting input to amplifier 544 is coupled to ground through line 546 and its third or controlling input at line 548 is coupled through resistor R12 to line 394 containing d.c. blocking capacitor C65 which, in turn, is associated with line 472 and −6 v supply. Line 394 it may be recalled is the control output for operating under battery voltage conditions as described in conjunction with FIG. 6 and functions to cause the system to operate at a ±175 v level at node rails 156 and 157. The resultant output of stage 544 at line 550 corresponds with this current input at line 548 and serves to adjust the crossover position otherwise developed at a zero level for the triangular waveshape asserted from the output of stage 444 at the opposite input to comparator 536. Thus, a selective phase lag control is asserted at line 318 which essentially adjusts toward a zero phase relationship between the synchronous rectifier and inverter components of d.c.-to-d.c. converter 52 under conditions of line power operation.

Relationship of Control Component 70 with Signal Component 68

To enhance the description of the relationship between the control components described in conjunction with FIG. 6 and the signal components described in conjunction with FIG. 7, a less detailed, block diagrammatic representation of them is provided in conjunction with respective drawings 8A and 8B. In the interest of facilitating the description, the blocks of the figures, in addition to being labeled, are identified by the corresponding numbers and symbols designated to identify the components and functions considered in the above descriptions of FIGS. 6 and 7. Looking to FIG. 8A, the flyback power supply again is represented at block 270 having an input from the battery energization line 105. The power supply 270 is enabled at start-up from network 272 by the action of transistor Q15 represented in block format and identified by the transistor designation. Transistor Q15 is turned on by a network 302 providing for a two second logic high value at line 306 which is directed to three input AND gate 284. During that two second interval, the initial voltage level of the battery at a no load state is evaluated by a network including transistor Q14 as shown in block form and similarly identified by the designated transistor and a one second start-up delay network is activated as represented at block 288. At the termination of that one second delay, a logic high is asserted by line 292 to the input of gate 284 and, assuming adequate no load battery voltage level availability, a corresponding third input to latch 284 is provided from line 282. With these three inputs being at logic high levels, a start-up enable signal is provided at line 308 which additionally functions to latch the power supply enable condition and the input at line 306 as represented by the block labelled D3 in correspondence with the diode having that function. In addition to being simultaneously applied to one input of the output enable gate 336 and the input enable gate 356, the start-up enable signal at line 308 also is directed via line 310 to a power up inhibit arrangement shown as labeled by a block further identified by the pertinent transistor designation Q16 which monitors the value of the 14 volt output of flyback power supply 270 as represented at line 326. When that value reaches a predetermined level, then the start-up enablement signal at line 310 is applied via line 324 to the d.c./d.c. driver for the d.c.-to-d.c. converter network 52 (FIG. 3) as represented at block 312. This requirement for an adequate power supply prior to the application of drive to the inverter switches avoids possibly destructive operation occasioned with switching prior to the presence of adequate voltage levels. In the protocol of start-up, the d.c.-to-d.c. conversion function 52 is activated initially. In this regard, the activation involves the employment of dead band delays between turning off of one transistorized switch and the turning on of the opposite. Such deadband delays are represented at blocks 316 and 322. When activated, the driver network 312 responds to a 50 KHz drive input at line 314 which is derived from the squarewave former shown at block 530 in FIG. 8B. The opposite input to the drivers in a phase controlled input at line 318 which is derived from a squarewave comparison circuit and functions to control the relative phase between the inverter component 53 and the synchronous rectifier 150 as described in conjunction with FIGS. 4A and 4B.

As the voltage at the node rails 156 and 157 commences to rise under the initial drive from the battery components 50, the voltage values thereat are monitored at network 332 in a manner providing a current source represented in block form and identified by the designations of transistor Q18, diode D9 and resistors R49, R53. The rails 156 and 157 are tapped from lines 372 and 374 and the instant current source monitoring approach provides a current input to a divider network and reference represented in block form and labelled by the included resistors R49-R57. When the rails reach a predetermined start-up level, i.e. 300 v, a value below the normal operational level for the battery which, on a rail-to-rail basis is about 375 v, then a 300 v present detect circuit as shown in block form and labelled by the corresponding transistors Q19 and Q20 provides a 300 v present signal at line 340. Line 340 is directed to one input of three input AND gate 336 which functions to enable the output converter function represented at block 64 in FIG. 3. The latter converter or inverter device is second in the protocol of start-up procedure. Accordingly, AND gate 336 receives a logic high value from line 340 and will have received a logic high value representing the start-up enable signal at line 308. Finally, the now free-running R-C phase shift type oscillator represented at block 420 in FIG. 8B will have commenced to derive a 60 Hz output at line 440 and also will have provided a zero cross-over signal as represented at line 346 and the related labelled block. This momentary zero crossing is latched as labelled in FIG. 8A at D7 and an enabling output then is provided at line 334 which, as represented in FIG. 8B functions to enable the output converter drive gates as labelled in the block identified at 484, 494.

The 300 v present signal also is directed, as represented by line 390, to a triac enable function represented by transistor Q21 now shown in FIG. 8A in block labelled form. The enablement of the triac at 206 in FIG. 4A permits the assertion of a utility line input to the apparatus. When sufficient voltage has been witnessed at this a.c. line input, then as represented in FIG. 8A by the appropriately labelled block identified by transistor identification Q17 and capacitor identification C35, a logic high signal is impressed to one input of three input AND gate 356 from line 368. This enabling input is combined with the start-up enable signal at line 308 and the 300 v present signal at line 344 to provide a logic high enabling signal at line 362 which is directed to the drive gates as represented by the labelled block in FIG. 8B at 508, 520.

Looking to the regulation of the converter functions, node rails 156, 157 are monitored at network 332 to provide for regulation to a preselected level, for example a 375 v span, by a battery power level regulation technique represented by the appropriately labeled block identified by transistor designation Q22. An error form of signal with respect to this desired level is developed at line 394 which is directed to a reference adjust function represented at block 544 in FIG. 8B. This reference adjust in one a.c. input to a comparator represented at block 536, the opposite input thereto being derived from line 534 which is introduced to a comparator and squarewave function represented by a block labelled 536. The output at line 318 is directed to the d.c./d.c. converter drivers 312 as shown in FIG. 8A, the output of which at lines 168 and 170 is employed to drive the synchronous rectifier 150 initially under a phase lagging condition to provide for energy transfer to the node rails 156 and 157. As the battery operational desired node voltage level is approached, then the signal at line 394 diminishes. The inverter function 52 is driven by a 50 KHz squarewave which is derived, as before, from the master triangle waveform generator 444 from lines 534 and 528. This squarewave output a line 314 additionally is shown being directed to the d.c./d.c. drivers 312 as shown in FIG. 8A to provide outputs at lines 134 and 136. As the utility or line source input is applied by enablement from gate 356 (FIG. 8A) the R-C phase shift oscillator represented at block 420 in FIG. 8B alters to a phase coincidence therewith and the corresponding coincidence is seen at the 60 Hz output at line 440. Line 440 is directed to one input of a comparator 442 as labelled in block form in FIG. 8B and the signal at line 440 is compared with a triangle waveform from line 478 and derived form a slave generator as represented at block 446. The amplitude of this output is adjusted in accordance with the voltage across the node rails 156 and 157 which is derived from network 332 and presented at line 380 as shown in FIG. 8A. The PWM output of comparator 442 is presented as represented at line 480 to drive gates as labelled in FIG. 8B and identified at 484, 494. These gates, as above discussed, are enabled from line 334 in second position in the start-up protocol to provide PWM signals to actuate the drive circuits via lines 242 and 243. The latter circuits are represented at blocks 226 and 228 in FIG. 4B. Note that a deadband delay interval is provided intermediate switching actuations at the output inverter drive gates as represented by the labeled block identified with designated components C55, R98.

As the voltage across node rails 156 and 157 elevates above battery operational levels. Control from the battery power level regulation as labeled in FIG. 8A diminishes such that a relative zero phase lag exists between the synchronous rectifier 150 and the inverter 53 (FIG. 4B). As this occurs, higher level rail voltage regulation commences as shown in labeled block form and further identified by transistor designation Q23 to provide an error signal at line 410. Looking to FIG. 8B, line 410 is seen to be directed to the input of the master triangle waveform generator shown in labeled block form and represented at 444. A triangle waveform having an amplitude varying in accordance with the error signal then is presented at line 454 for introduction to one input of a comparator so labeled and shown in block form as well as being represented by corresponding number 502 in the figure. The opposite input to the comparator 502 is shown at line 222 and is a mirror form of the source input a.c. signal suitably porportioned to develop a PWM signal at line 506 which is directed to driving gates for the input inverter function as shown in block form and labeled, as well as designated by the corresponding numbers 508 and 520. These gates are enabled as represented at line 362 and described in conjunction with FIG. 8A at gate 356. As before, a dead band delay is provided in conjunction with the switching function as labeled in FIG. 8B and shown to include the designated corresponding components, capacitor C57 and resistor R101.

Since certain changes may be made in the above-described apparatus without departing from the scope of the invention herein involved, it is intended that all matter contained in the description thereof or shown in the accompanying drawings shall be interpreted as illustrative and not in a limiting sense.

We claim:

1. Power supply apparatus employable with an a.c. source of given voltage and frequency characteristics for providing a regulated output to a load, comprising:
    node means for receiving and conveying energy and exhibiting d.c. voltage levels;
    input a.c.-to-d.c. converter means having an a.c. side connectable with said a.c. source and a d.c. side connected with said node means for effecting energy transmission from said a.c. source when enabled;
    output d.c.-to-a.c. converter means having an a.c. side connectable with said load and a d.c. side connected with said node means for controllably deriving said related output when enabled;
    battery means for providing a rechargeable storage reservoir and exhibiting given voltage levels;
    d.c.-to-d.c. converter means coupled intermediate said node means and said battery means for controllably transferring energy from said battery means to said node means when enabled and for selectively effecting the charging of said battery means from said node means;
    switch means for actuation between on and off conditions; and
    control means including:
        start-up control means responsive to said switch means actuation from said off to said condition, and further responsive to the to the presence of the first predetermined said given voltage level exhibited by said battery means, for deriving a start-up enabling for effecting said enablement of said d.c.-to-d.c. converter means to derive said node means d.c. voltage levels, and node monitoring circuit means responsive to said node means d.c. voltage levels for deriving a first mode voltage responsive signal when said node means d.c. voltage levels reach a predetermined start-up value, and
        output control means responsive to said first node voltage responsive signal and said start-up enabling signal for effecting said enablement of said output d.c.-to-a.c. converter means.

2. The power supply apparatus of claim 1 in which:
    said output d.c.-to-a.c. converter means includes output oscillator means for deriving the frequency of said a.c. side thereof;
    said control means includes:
    cross-over detection means responsive to derive a cross-over signal in correspondence with a zero voltage cross-over of said oscillator means; and
    said output control means additionally is responsive to said cross-over signal in the presence of said first node voltage responsive signal and said start-up enabling signal for effecting said enablement of said output d.c.-to-a.c. converter means.

3. The power supply apparatus of claim 1 in which said start-up control means is responsive additionally to the time-out of a predetermined first start-up interval commencing with said switch means actuation for deriving said start-up enabling signal.

4. The power supply apparatus of claim 1 in which said control means includes:
    power supply means responsive to said battery means and said switch means actuation for deriving supply outputs exhibiting predetermined voltage levels for energizing select components of said control means; and
    said control means start-up control means includes power-up inhibit means responsive to a select said power supply means supply output for inhibiting the said enablement of said d.c.-to-d.c. converter means until said supply output develops a predetermined voltage level.

5. The power supply apparatus of claim 1 in which said control means includes:
    power supply means responsive to said switch means actuation for deriving supply outputs, when enabled, exhibiting predetermined voltage levels;
    said start-up control means includes time-limited enablement means responsive to said switch means actuation from said off to said on condition deriving said first voltage level for deriving a power supply enable signal for a predetermined supply start-up interval to enable said power supply means and for effecting said derivation of said start-up enabling signal, means for maintaining said power supply enable signal in response to said start-up enabling signal and the presence of at least a predetermined load related voltage level at said battery means.

6. The power supply apparatus of claim 5 in which:
    said start-up control means is responsive additionally to the time-out of a predetermined first start-up interval commencing with said switch means actuation for deriving said start-up enabling signal; and
    said time-limited enablement means predetermined supply startup interval is of greater extent than said predetermined first start-up interval, and further is responsive to said switch means actuation from said on to said off and thence to said on conditions to derive said power supply enablement signal subsequent to said battery means voltage level falling below said predetermined load related voltage level.

7. The power supply apparatus of claim 1 in which:
said control means includes an a.c. source evaluation means for deriving a source status signal in the presence of predetermined voltage values at said a.c. source; and
including input control means responsive to said first node voltage responsive signal, said start-up enabling signal and said source status signal for enabling said input a.c.-to-d.c. converter means.

8. The power supply apparatus of claim 1 including:
a.c. switching means coupled intermediate said a.c. source and said input a.c.-to-d.c. converter a.c. side for controllably conveying an input source corresponding to said a.c. source to said input inverter a.c. side when enabled; and
wherein said node monitoring circuit means includes means for enabling said a.c. switching means in response to said first node voltage responsive signal;
said control means includes a.c. source evaluation means for deriving a source status signal in the presence of predetermined voltage values of said input source; and
including input control means responsive to said first node voltage responsive signal, said start-up enabling signal and said source status signal for enabling said input a.c.-to-a.c. converter means.

9. The power supply apparatus of claim 1 in which:
said control means includes:
power supply means responsive to said battery means and said switch means actuation for deriving supply outputs exhibiting predetermined voltage levels for energizing select components of said control means;
said control means start-up control means includes power-up inhibit means responsive to a select said power supply means supply output for inhibiting the said enablement of said d.c.-to-d.c. converter means until said supply output develops a predetermined voltage level;
a.c. source evaluation means for deriving a source status signal in the presence of predetermined voltage values at said a.c. source; and
including input control means responsive to said first node voltage responsive signal, said start-up enabling signal and said source status signal for enabling said input a.c.-to-d.c. converter means.

10. The power supply apparatus of claim 1 in which:
said output d.c.-to-a.c. converter means includes output oscillator means for deriving the frequency of said a.c. side thereof;
said control means includes:
cross-over detection means responsive to derive a cross-over signal in correspondence with a zero voltage cross-over of said oscillator means;
said output control means additionally is responsive to said cross-over signal in the presence of said first node voltage responsive signal and said start-up enabling signal for effecting said enablement of said output d.c.-to-a.c. converter means;
power supply means responsive to said switch means actuation for deriving supply outputs, when enabled, exhibiting predetermined voltage levels; and
said start-up control means includes time-limited enablement means responsive to said switch means actuation from said off to said on condition deriving said first voltage level for deriving a power supply enable signal for a predetermined supply start-up interval to enable said power supply means and for effecting said derivation of said first start-up enabling signal, means for maintaining said power supply enable signal in response to said first start-up enabling signal and the presence of at least a predetermined load related voltage level at said battery means.

11. The power supply apparatus of claim 10 in which:
said time-limited enablement means predetermined supply start-up interval is of greater extent than said predetermined first start-up interval, and further is responsive to said switch means actuation from said on to said off and thence to said on conditions to derive said power supply enablement signal subsequent to said battery means voltage level falling below said predetermined load related voltage level.

12. The power supply apparatus of claim 1 including:
a.c. switching means coupled intermediate said a.c. source and said input a.c.-to-d.c. converter a.c. side for controllably conveying an input source corresponding to said a.c. source to said input converter a.c. side when enabled;
wherein said output d.c.-to-a.c. converter means includes output oscillator means for deriving the frequency of the a.c. side thereof;
said control means includes:
cross-over detection means responsive to derive a cross-over signal in correspondence with a zero voltage cross-over of said output oscillator means, and
said output control means additionally is responsive to said cross-over signal in the presence of said first node voltage responsive signal and said start-up enabling signal for effecting said enablement of said output d.c.-to-a.c. converter means,
said node monitoring circuit means includes means for enabling said a.c. switching means in response to said first node voltage responsive signal,
a.c. source evaluation means for deriving a source status signal in the presence of predetermined voltage values of said input source; and
including input control means responsive to said first node voltage responsive signal, said start-up enabling signal and said source status signal for enabling said input a.c.-to-d.c. converter means.

13. Power supply apparatus for use with an a.c. source of given voltage and frequency for providing an output to a load, comprising:
node means for receiving and conveying energy and exhibiting d.c. voltage levels;
a.c. control means connectable with said a.c. source for conveying corresponding a.c. energy to an output when enabled;
input a.c.-to-d.c. converter means having an a.c. side coupled with said a.c. control means output and a d.c. side connected with said node means for effecting energy transmission from said a.c. source when enabled and in response to a first control input;
battery means for providing a rechargeable storage reservoir and exhibiting given voltage levels;
oscillator means for providing an a.c. output of predetermined frequency and phase and having an input responsive to an applied a.c. signal of given phase derived from said a.c. control means output for effecting phase coincidence between said given phase and said output phase;

signal generation means for generating a triangle waveshape output of controlled amplitude;

output d.c.-to-a.c. converter means having an a.c. side connectable with said load and a d.c. side coupled with said node means controllably responsive to said oscillator means output and said signal generator means output for deriving said regulated output when enabled;

d.c.-to-d.c. converter means coupled intermediate said node means and said battery means for transferring energy from said battery means to said node means when enabled and in response to a said control input and for selectively effecting the charging of said battery means from energy at said node means;

control means including:

start-up control means responsive to the presence of a first predetermined said voltage level at said battery means for deriving a first enabling signal effecting said enablement of said d.c.-to-d.c. converter means to initially develop said node means voltage levels from said battery means, and node monitoring circuit means responsive to said node means voltage levels for deriving a first node voltage responsive signal when said node means levels reach a predetermined first value; and output control means responsive to said first enabling signal and said first node voltage responsive signal for effecting the enablement of said output d.c.-to-a.c. converter means.

14. The power supply apparatus of claim 13 in which: said control means includes cross-over detection means responsive to a zero voltage cross-over by said oscillator means a.c. output for deriving a cross-over signal; and said output control means is additionally responsive to said cross-over signal for effecting said enablement of said output d.c.-to-a.c.

15. The power supply apparatus of claim 13 in which said node monitoring circuit means includes means for enabling said a.c. control means in response to said first node voltage responsive signal.

16. The power supply apparatus of claim 13 in which: said control means includes a.c. source evaluation means responsive to said a.c. control means output when enabled for deriving a source status signal in the presence of predetermined voltage values at said a.c. source; and including input control means responsive to said a.c. source evaluation means source status signal for enabling said input a.c.-to-d.c. converter means.

17. The power supply apparatus of claim 16 in which said input control means additionally is responsive to said first enabling signal and said first node voltage responsive signal for enabling said input d.c.-to-d.c. converter means.

18. The power supply apparatus of claim 16 in which: said control means includes cross-over detection means responsive to a zero voltage cross-over by said oscillator means a.c. output for deriving a cross-over signal; and said output control means is additionally responsive to said cross-over signal for effecting said enablement of said output d.c.-to-a.c. converter means.

19. The power supply apparatus of claim 18 in which said node monitoring circuit means includes means for enabling said a.c. control means in response to said first node voltage responsive signal.

20. The power supply apparatus of claim 13 in which: said node monitoring circuit means includes:

attenuation network means coupled with said node means for deriving a line node output of first proportion with respect to instantaneous said node means voltage levels, and deriving a battery node output of second proportion with respect to instantaneous said node means voltage levels, said second proportion being lesser than said first proportion;

means defining a reference output;

first comparison network means responsive to compare said battery node output with said reference output to derive said d.c.-to-d.c. converter means second control input over a predetermined first range of said node means voltage levels extending to a predetermined nominal battery operational voltage level; and second comparison network means responsive to compare said line node output with said reference output to derive said a.c.-to-d.c. input converter means first control input over a predetermined second range of said node means voltage levels extending substantially from said predetermined nominal battery operational voltage level to a predetermined nominal line operational level.

21. The power supply apparatus of claim 20 in which said attenuation network means includes means deriving control output in select proportion to instantaneous said node means voltage levels for effecting said signal generator means controlled triangle waveshape amplitude.

22. The power supply apparatus of claim 13 in which said control means includes:

power supply means responsive to said battery means and said switch means actuation for deriving supply outputs exhibiting predetermined voltage levels for energizing select components of said controls means; and said control means start-up control means includes power-up inhibit means responsive to a select said power supply means supply output for inhibiting the said enablement of said d.c.-to-d.c. converter means until said supply output develops a predetermined voltage level.

23. Power supply apparatus for use with an a.c. source and providing an output for a load, comprising:

node means exhibiting given voltage levels;

an input converter having an a.c. side connectable with said a.c. source and a d.c. side coupled with said node means;

output converter means having a d.c. side connected with said node means and an a.c. side connectable with said load for supplying a regulated a.c. output thereto when enabled;

battery means for providing a rechargeable energy reservoir and exhibiting given voltage levels;

bidirectional inverter means having a d.c. side coupled with said battery means for energization thereform for providing an output of predetermined frequency when enabled;

bidirectional a.c.-to-d.c. converter means having a d.c. side coupled with said node means and responsive to said bidirectional inverter means output for energizing said node means;

control means including:

power supply means energizable from said battery means for deriving supply outputs exhibiting predetermined voltage levels;

start-up control means including power supply monitoring means for effecting said enablement of said bidirectional inverter means only when a select said power supply means output is at or above a predetermined said voltage level.

24. The power supply apparatus of claim 23 in which:

said bidirectional inverter means includes solid-state switching means selectively actuable to derive said output of predetermined frequency, and driver means for actuating said solid-state switching means when enabled; and said power supply monitoring means effects said bidirectional inverter means enablement by enabling said driver means.

25. The power supply apparatus of claim 23 in which:

said control means start-up control means includes means responsive to the presence of a first predetermined said voltage level at said battery means and to the timeout of a predetermined start-up interval for deriving a start-up enabling signal; and said power supply monitoring means is responsive in the presence of both said power supply means output predetermined said voltage level and said start-up enabling signal for effecting said enablement of said bidirectional inverter means.

26. The power suply apparatus of claim 25 in which said control means includes:

Node monitoring circuit means responsive to said Node means given voltage levels for deriving a node voltage responsive signal when said node means given levels reach a predetermined start-up value; and output control means responsive to said node voltage responsive signal and said start-up enabling signal for effecting said enablement of said output converter means.

* * * * *